(12) United States Patent
Lappeteläinen et al.

(10) Patent No.: US 6,760,877 B1
(45) Date of Patent: Jul. 6, 2004

(54) METHOD FOR FORMING ACKNOWLEDGEMENT DATA IN A WIRELESS COMMUNICATION SYSTEM AND A WIRELESS COMMUNICATION SYSTEM

(75) Inventors: Antti Lappeteläinen, Espoo (FI); Visa Tapio Smolander, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/569,007

(22) Filed: May 11, 2000

(30) Foreign Application Priority Data

May 12, 1999 (FI) ................................. 991102
Jun. 1, 1999 (FI) ................................. 991240

(51) Int. Cl.$^7$ ..................... G08C 25/02; G01R 31/28; H03M 7/02
(52) U.S. Cl. ..................... 714/748; 714/712; 714/821
(58) Field of Search ................. 714/748, 751, 714/752, 758, 746, 712, 819, 820, 821, 4, 37, 43

(56) References Cited

U.S. PATENT DOCUMENTS

| | | | |
|---|---|---|---|
| 5,088,108 A | * | 2/1992 | Uddenfeldt et al. ........ 375/230 |
| 5,168,497 A | * | 12/1992 | Ozaki et al. ................. 370/394 |
| 5,499,397 A | * | 3/1996 | Wadin et al. ............. 455/277.1 |

FOREIGN PATENT DOCUMENTS

| | | |
|---|---|---|
| EP | 0703685 A2 | 3/1996 |
| EP | 0797327 A2 | 9/1997 |
| WO | WO 00/21236 | 4/2000 |

* cited by examiner

Primary Examiner—Christine T. Tu
(74) Attorney, Agent, or Firm—Perman & Green, LLP

(57) ABSTRACT

The invention relates to a method in a wireless communication system (1) comprising wireless terminals (MT1–MT4), a communication channel (CH) and at, least one access point (AP1, AP2) and access point controller (AC1, AC2). The method comprises the steps of activating at least one data transmission connection between the wireless terminal (MT1–MT4) and the access point (AP1), in which information is transmitted in packets, forming data frames (FR) for the transmission of the packets, supplementing said data frame (FR) with at least one item of error checking data, in whose formation at least a part of the information contained in the data frame (FR) is used, converting said data frames (FR) into signals to be transmitted on the communication channel, receiving signals transmitted on the communication channel and converting them into data frames, forming reference.data corresponding to at least one item of error checking data on the basis of the information received in the data frame (FR), comparing the received error checking data with said reference data, and setting up an acknowledgement message, in which information on the received parts of the data frame (FR) is transmitted from the device (MT1–MT4) receiving the data frames to the device (AP1, AP2).

31 Claims, 16 Drawing Sheets

Figure 1A:
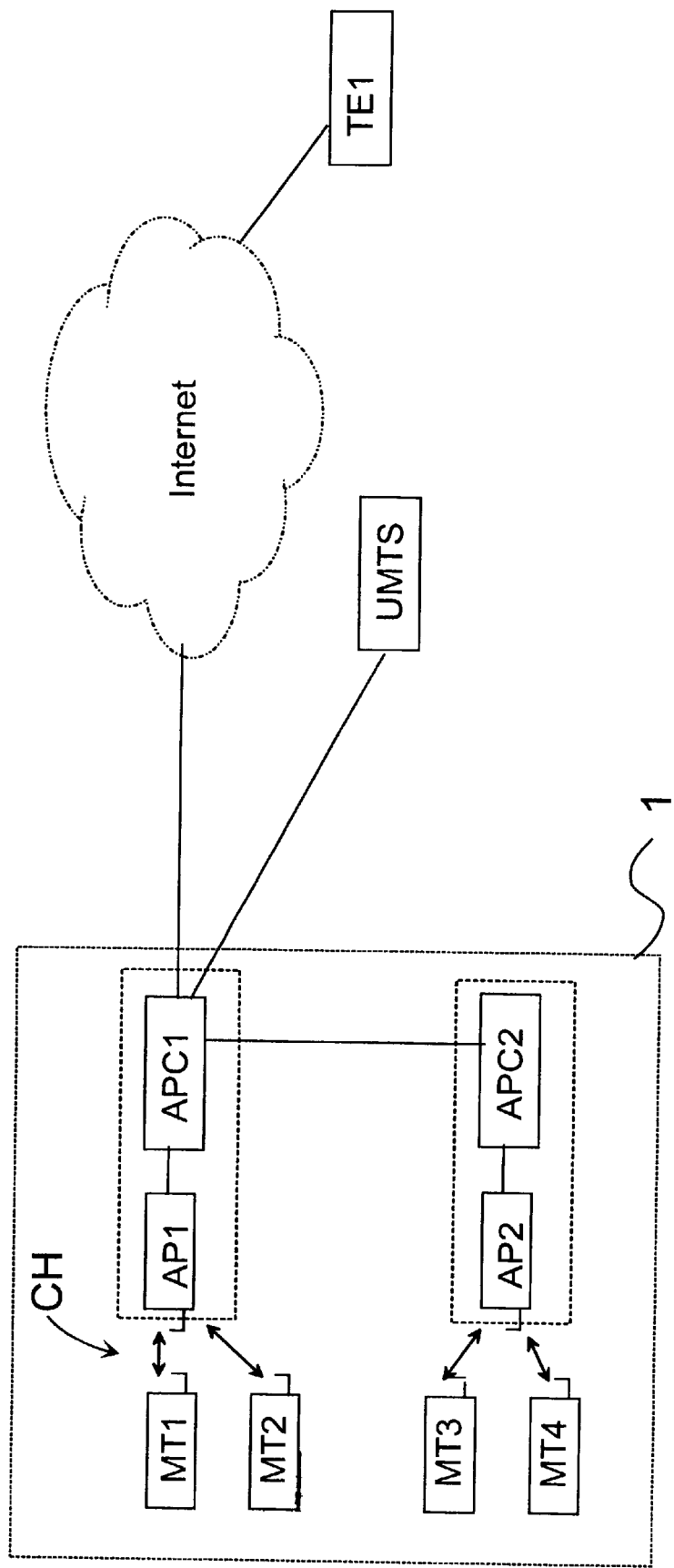

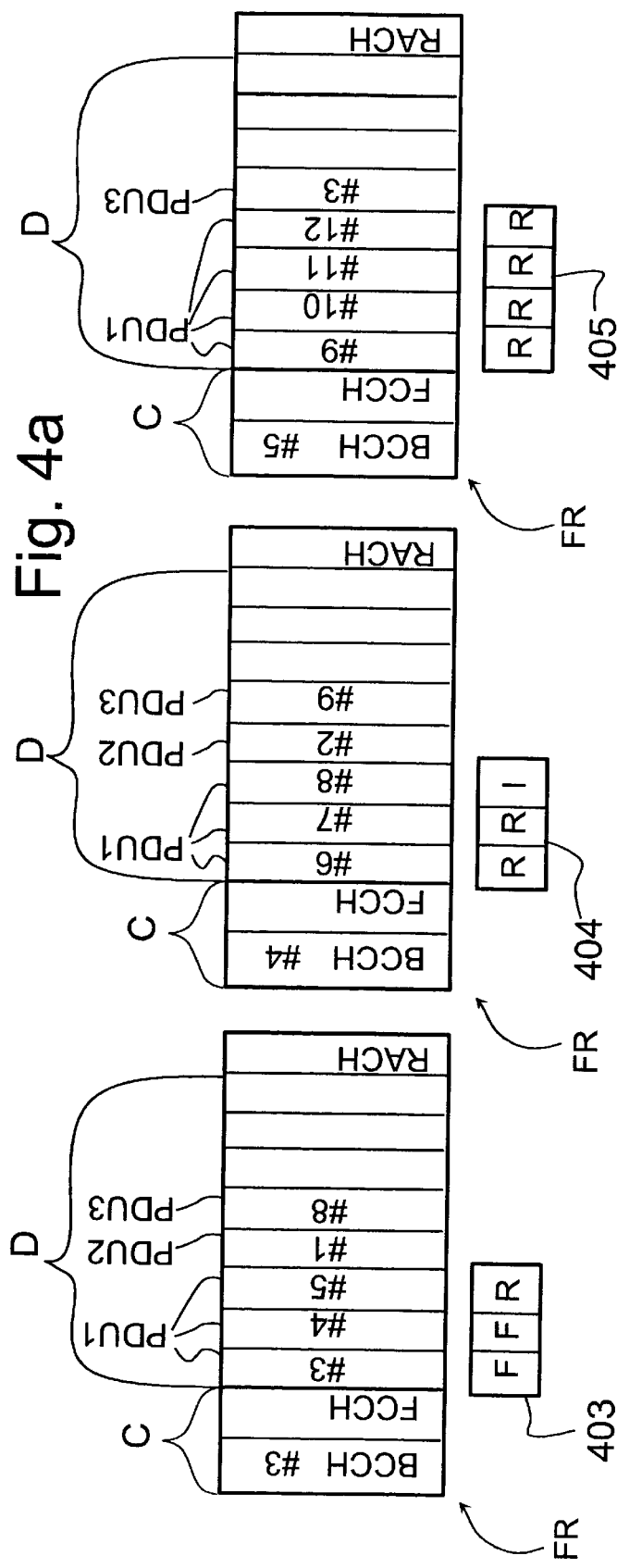
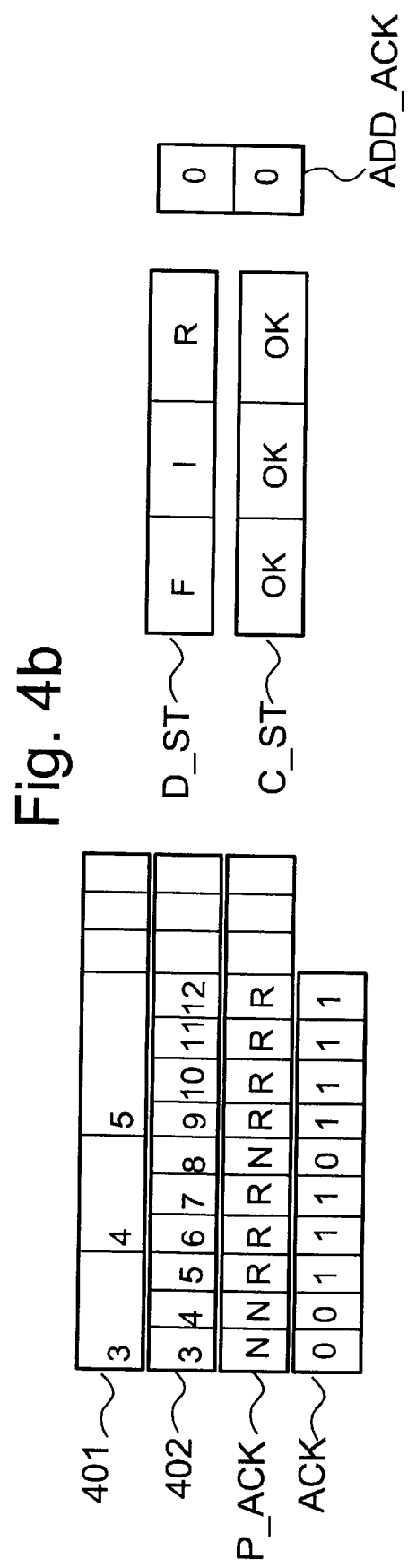
Fig. 4a
Fig. 4b

METHOD FOR FORMING ACKNOWLEDGEMENT DATA IN A WIRELESS COMMUNICATION SYSTEM AND A WIRELESS COMMUNICATION SYSTEM

The present invention relates to a method in a wireless communication system as set forth in the preamble of the appended claim 1. The invention relates also to a wireless communication system as set forth in the preamble of the appended claim 15.

A considerable increase in the use of information services as a result of an increase in particularly the Internet and so-called World Wide Web (WWW) services has brought about a need to develop faster communication services for transferring information between a provider of an information service and a terminal using the information service. Furthermore, several information services also comprise so-called multimedia information, such as images, video images, and sound. The transmission of such multimedia information requires a high data transmission rate to execute the data transmission as close to real time as possible.

Communication systems intended for an office environment, so-called local area networks (LAN), are to a great deal implemented as wired systems. Thus, the data transmission connection between terminals and a server is implemented either electrically via a cable or optically via an optical fibre. It is an advantage of such a fixed system that relatively high data transmission rates can be achieved. A drawback in such a fixed communication network is that it is difficult to make changes, and the terminals must usually be placed relatively close to connection points intended for them, whereby the movability of the terminal is affected. The implementation of such a wired local area network in an already existing building is not always successful, or the wiring of cables afterwards is expensive. On the other hand, a communication cable system which may already exist particularly in older buildings is not necessarily suitable for fast data transmission.

For implementing local area networks, there are several wireless communication systems under development. Several wired communication systems are based on the use of radio signals in data transmission.

One such communication system for a local area network based on radio communication is the so-called HIPERLAN (HIgh PErformance Radio Local Area Network). Such a radio network is also called a broadband radio access network (BRAN).

In version 2 of the HIPERLAN communication system under development, the aim is to achieve a data transmission rate of even more than 30 Mbit/s, the maximum cell range being some tens of metres. Such a system is suitable for use in the same building e.g. as an internal local area network for one office. There is also a so-called HIPERACCESS communication system under development, in which an aim is to achieve the same data transmission rate as in said HIPERLAN/2 communication system but with the cell range of some hundreds of metres, wherein the HIPERACCESS system is applicable for use as a larger local area network e.g. in schools and larger building complexes.

Figure 1B:
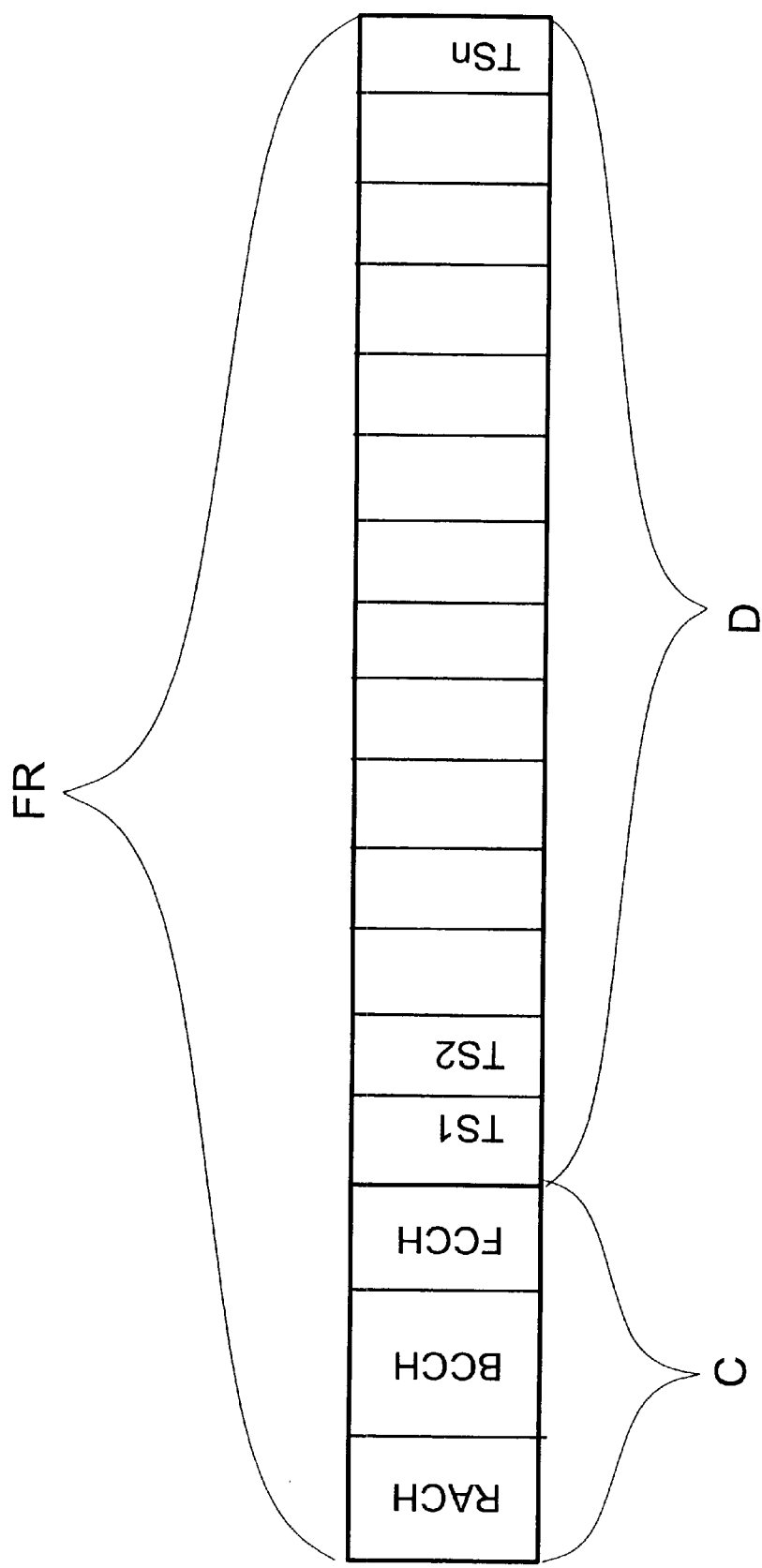

In the HIPERLAN/2 system which is used as an example, the frame structure used in the data link layer DLC is shown in a reduced manner in the appended FIG. 1b. The data frame FR consists of control fields C, such as RACH (Random Access CHannel), BCCH (Broadcast Control CHannel) and FCCH (Frame Control CHannel), as well as a data field D which comprises a given number of time slots TS1, TS2, . . . , TSsn, in which it is possible to transmit actual payload information.

Each control field C as well as the packets to be transmitted in the time slots of the data field preferably comprise error checking data which has been calculated by an access point AP1 that transmits the data frame and added into the control fields C of the data frame and to the packets to be transmitted in the time slots TS1, TS2, . . . , TSn. This checking data is preferably a checksum calculated on the basis of information contained in said field, such as CRC (Cyclic Redundancy Check). In the receiving wireless terminal MT1, it is possible to use the error checking data to examine if the data transmission possibly contained any errors. There can also be several such error check data in the field C, D, calculated on part of the information contained in the field. For example in the HIPERLAN/2 system, the FCCH control field consists of smaller information elements, for which error checking data is calculated respectively. The number of these information elements may vary in each data frame. All data frames do not necessarily have an FCCH control field, in which case the number of information elements is zero.

Communication in the HIPERLAN/2 system is based on time division multiple access TDMA, wherein there can be several connections simultaneously on the same channel, but in said frame each connection is allotted a time slot of its own, in which data is transmitted. Because the quantity of data to be transmitted is usually not constant in all the simultaneous connections, but it varies in time, a so-called adapted TDMA method is used, in which the number of time slots to be allocated for each data transmission connection may vary from zero to a maximum, depending on the loading situation at each time as well as on the data transmission capacity allocated for the connection.

For the time division multiple access to work, the terminals coupled to the same node must be synchronized with each other and with the transmission of the node. This can be achieved for example in such a way that the receiver of the wireless terminal receives signals on a channel. If no signal is detected on the channel, the receiver shifts to receive on another channel, until all the channels are examined or a channel is found on which a signal is detected that is transmitted from an access point. By receiving and demodulating this signal, it is possible to find out the time of transmission of the control channel BCCH of the access point in question and to use this to synchronize the terminal. In some cases, the terminal may detect a signal from more than one access points, wherein the terminal preferably selects the access point with the greatest signal strength in the receiver and performs synchronization to this access point.

After the terminal is synchronized to the access point, the terminal can start a connection set-up to couple to this access point. This can be performed preferably so that the terminal transmits a connection set-up request to the access point on the RACH control channel. In practice, this means that the terminal transmits in a time slot allocated for the RACH control channel and the access point simultaneously listens to communication on the channel, i.e. receives signals on the channel frequency used by the same. After detecting that a terminal is transmitting a connection set-up request message, the access point takes the measures required for setting up the connection, such as resource allocation for the connection, if possible. In the resource allocation, the quality of service requested for the connection is taken into account, affecting e.g. on the number of time slots to be allocated for the connection. The access point informs the terminal if the connection set-up is possible or not. If it has been possible to set up a connection, the access point transmits in the BCCH control field information e.g. on the transmission time slots, receiving time slots, connection identifier, etc. allocated for the connection. The number of transmission and receiving time slots is not necessarily the same, because in many cases the quantity of information to be transmitted is not the same in both directions. For example, when an Internet browser is used, considerably less information is transmitted from the terminal than information is received to the terminal. Thus, for the terminal, fewer transmission time slots are needed than receiving time slots. Furthermore, the number of time slots allocated for the connection may preferably vary in different frames according to the need to transmit information at the time. The access point controller is provided with a so-called scheduler, which serves e.g. the purpose of allocating time slots for different connections as mentioned above. The scheduler is implemented preferably in an application program in the access point controller.

Because full-duplex communication is needed in local area networks, also a full-duplex data transmission connection is needed on the radio channel. In a time division system this can be implemented either in such a way that some of the time slots in a frame are allocated for transmission from the wireless terminal to the access point (uplink) and some are allocated for transmission from the access point to the wireless terminal (downlink), or in such a way that a separate frequency band is allocated for each communication direction. In the HIPERLAN/2 system, the introduction of the first mentioned method is proposed, wherein the access point and the terminals coupled therewith do not transmit simultaneously.

In the HIPERLAN/2 systems, the access points can select the channel to be used in the connection irrespective of the other access points. Furthermore, the scheduler of the access point selects the moment of time to be used for the transmission irrespective of the other access points. In practice, this means that two or more access points can make an attempt to transmit simultaneously on the same channel, wherein the transmission is unsuccessful. In order to prevent this collision of transmissions, the transmitting access point or wireless terminal first listens to the communication of that channel on which the transmission is conducted. If no communication is detected on the channel within a given period of time, it is presumed that the channel is free and the transmission can be started. However, if communication is detected on the channel, the receiver is synchronized with this transmission. When the transmission is terminated, a possible new message is waited for and after that it is possible to retry to obtain the channel. However, several access points and/or wireless terminals may be waiting for their transmission turn, wherein situations may occur where several devices make an attempt of transmitting simultaneously. Furthermore, situations may arise in which all the devices on a particular channel are waiting for a transmission turn, i.e. the channel is under utilized. On the other hand, information is not transmitted in every time slot in every frame, wherein during such an empty time slot the channel is under utilized, because any other device waiting for transmission cannot transmit either during such a time slot in the present system.

As was presented earlier in this description, the radio local area network can comprise several access points, the scope of whose service area is influenced by the transmission capacity, ambient conditions, possible obstructions in the path of the signal, the directional pattern of the antenna, etc. In practice, the boundaries of the service area of the access points cannot be clearly defined, but the service areas of the access points located in the vicinity of each other overlap one another at least partly. Thus, in some cases, the wireless terminal can be located within the service area of two or more access points, but these access points do not necessarily detect the transmissions of each other and cannot synchronize with each other. The wireless terminal selects one of these access points to be used in the data transmission connection. On the other hand, the access point used in the connection at a given time can be changed when the wireless terminal is moved or when the quality of the connection varies, which is known as such. Because the access points can select the channel to be used in the connection irrespective of the other access points, and schedule the transmissions independently, it is possible that the properties of the data transmission between a wireless terminal and an access point used in the connection at a given time are influenced by one or more access points within whose service area the wireless terminal is located. Such interference can also occur in situations in which the frequencies to be used are not the same, but two access points transmit for example on adjacent channels.

The access points that interfere with the data transmission can also be access points of another radio network. This is possible especially in cases when in the same office building there are several radio network systems utilizing frequency ranges which overlap each other at least partly.

In addition to interference caused by other radio devices, the properties of the data transmission are also affected by changes in ambient conditions. These changes may be caused e.g. by the multipath propagation of the signal, by the movement of the wireless terminal within the service area of the communication network, from the area of one cell to the area of another cell, or outside the service area of the communication network, wherein the propagation conditions of the signal may vary. Also changes in the temperature and humidity of air may affect the propagation of the signal and cause changes in the data transmission connection. Such changes may cause changes in the strength of the received signal, i.e. fading. Thus, part of the signal may be attenuated so much that the receiver cannot find out the information transmitted in the signal, wherein the data transmission fails. Such attenuation can, however, be transient, and after a moment the connection may be restored to a sufficiently reliable level even without changing the access point and/or frequency level of the connection. Nevertheless, in radio local area networks of prior art, attempts are made to correct a communication failure caused by attenuation by finding out whether it is possible to select another channel or another access point for the data transmission connection. However, it is possible that the fading will also affect communication via another access point or on another channel.

One criterion for setting up a connection between a wireless terminal and an access point is the quality of service (QoS) desired for the connection. In some connections, for example in data connections, the rate of the data transmission is not as significant a criterion as the reliability of the data transmission. Thus, the data transmission parameters are selected in such a way that as reliable a data transmission as possible is achieved. On the other hand, for example when transmitting an audio and video signal, it is the real-time quality of the data transmission that is important, not the accuracy. For such a connection requiring realtime data transmission, it is possible to allocate several time slots in a frame, wherein a higher data transmission rate can be achieved. If necessary, it is also possible to allocate several channels for one data transmission connection.

When the data transmission is being set up, the wireless terminal is listening to find out which access points have signals to be received. The wireless terminal advantageously measures the strength of the signals and selects the access point whose signal is the strongest at the moment. Thereafter the wireless terminal and the access point conduct connection set-up signalling for instance to transmit parameters such as the required data transmission rate, connection type, data transmission channel, time slots and connection identifier which are used in the connection.

Typically also during the connection, the wireless terminal measures the strength of the signal of the access point used in the connection as well as the strength of the signals of the other possible access points within the coverage area. If it is detected that the signal strength of another access point is sufficiently greater than the signal strength of the access point used at that particular moment, it is possible to conduct a handover to this access point, which is known as such.

The purpose of the present invention is to attain more effective utilization of the radio resources than in radio network systems of prior art. Another purpose of the invention is to produce a more disturbance-free data transmission system when compared with data transmission systems of prior art. The method according to the present invention is characterized in what will be presented in the characterizing part of the appended claim 1. The wireless data transmission system according to the present invention will be characterized in what will be presented in the characterizing part of the appended claim 15.

The invention is based on the idea that the cause of data transmission errors is examined and reported to that unit of the communication system which performs the selection of the channel to be used each time and/or other radio management algorithms, such as power control and link adjustment. This unit can thus either make the channel selection or continue the transmission on the same channel. In the HIPERLAN/2 system, the access point is the unit in which the channel selection is made. In some communication systems, the channel selection can be made by the wireless terminal.

Using the present invention, significant advantages are achieved when compared with methods and wireless communication systems of prior art. Using the method of the invention, the degree of utilization of each communication channel can be increased and the need to change the channel can be reduced. Moreover, in the communication system of the invention, the channel is not gratuitously changed particularly in such situations in which the data transmission errors are primarily due to the phenomenon of fading. In the communication system of the invention, it is possible to further reduce the rate of interference, because the access points do not increase their transmission output unnecessarily, wherein the degree of utilization of the communication system is significantly improved.

Figure 2:
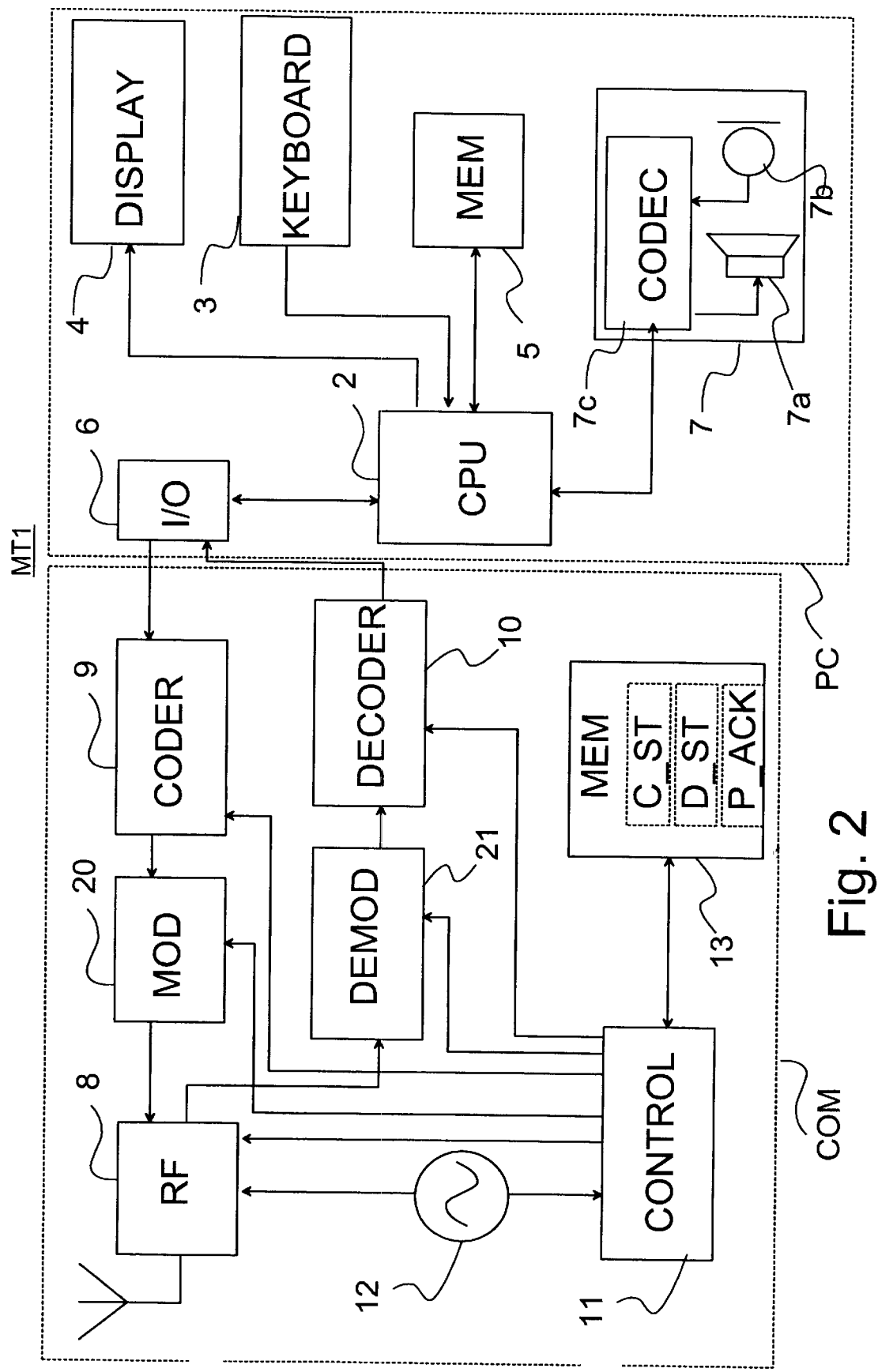
Figure 3:
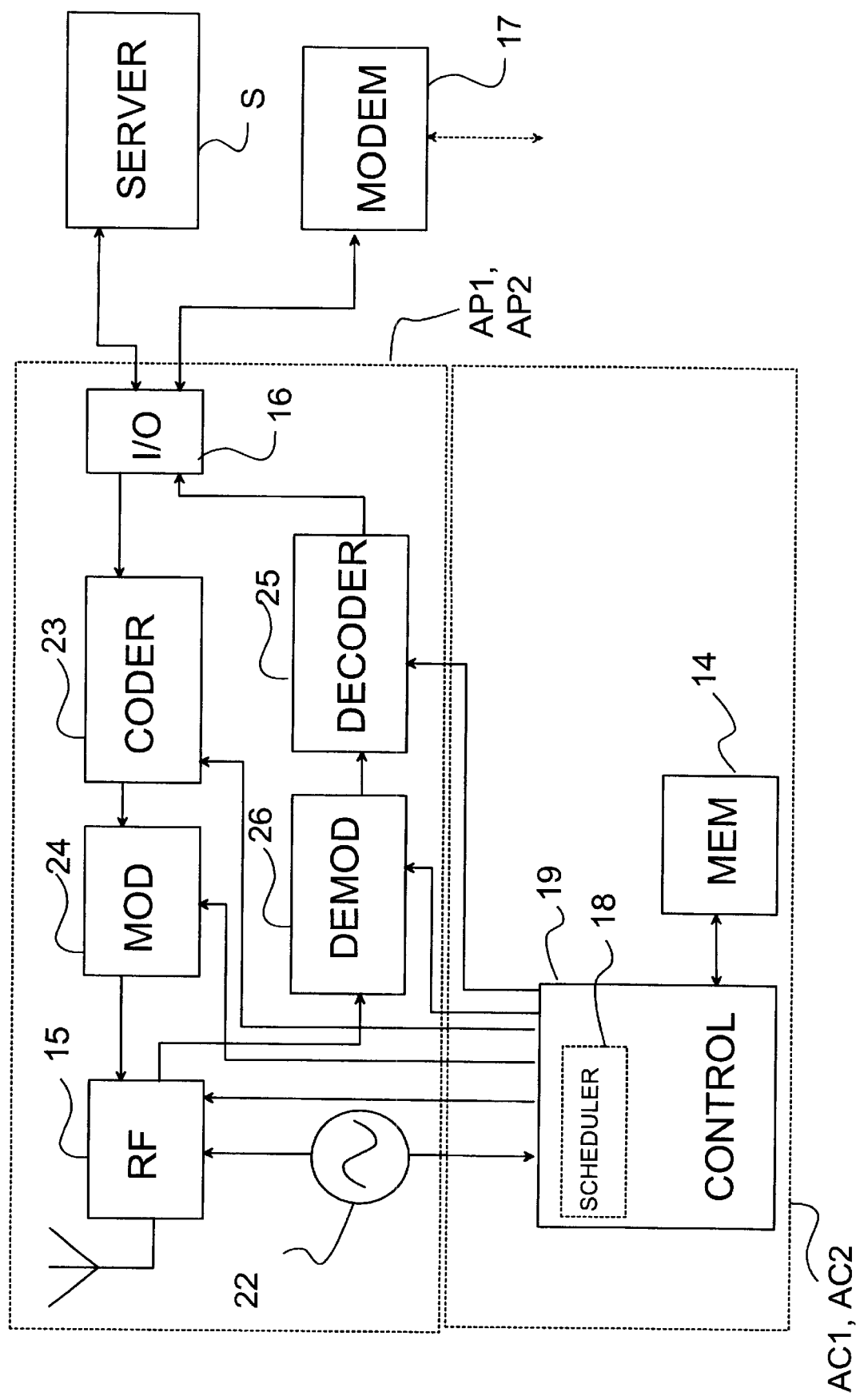
Figure 5:
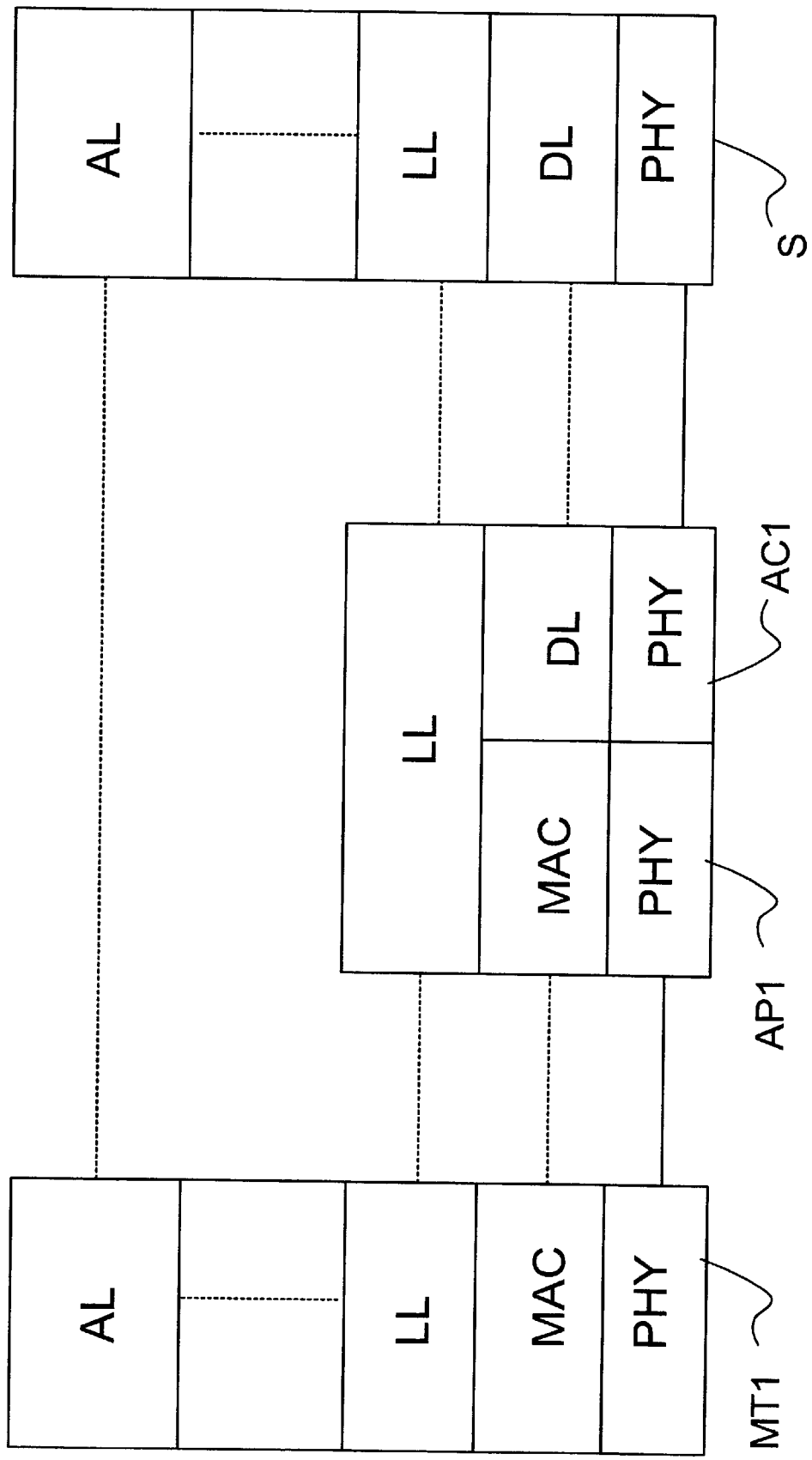

In the following, the invention will be described in more detail with reference to the appended drawings, in which FIG. 1a shows a communication system according to a preferred embodiment of the invention in a reduced block chart, FIG. 1b shows a data frame in the HIPERLAN/2 system, FIG. 2 shows a wireless terminal according to a preferred embodiment of the invention in a reduced-block chart, FIG. 3 shows an access point and an access point controller according to a preferred embodiment of the invention in a reduced block chart, FIG. 4a shows examples of some data frames, FIG. 4b shows examples of information structures to be used in a wireless terminal according to a preferred embodiment of the invention, FIG. 5 shows protocol stacks to be used in a communication system according to a preferred embodiment of the invention in a reduced manner, and FIGS. 6a–6j illustrate the function of the method according to a preferred embodiment of the invention in a flow chart.

In the following description of a communication system 1 according to a preferred embodiment of the invention, the HIPERLAN/2 system of FIG. 1a will be used as an example, but it is obvious that the invention is not limited solely to this system. The communication system 1 consists of wireless terminals MT1–MT4, one or several access points AP1, AP2, as well as one or more access point controllers AC1, AC2. Between the access point AP1, AP2 and the wireless terminal MT1–MT4, radio communication is set up for transmitting e.g. signals needed for setting up a connection and information during the connection, such as data packets of an Internet application. The access point controller AC1, AC2 controls the operation of the access point AP1, AP2 and the connections formed via them to the wireless terminals MT1–MT4. The access point controller AC1, AC2 has a controller 19, in whose application software some functions of the access point are implemented, such as a scheduler for the access point which performs different scheduling operations in a manner known per se. In such a radio network, several access point controllers AC1, AC2 can communicate with each other and with other data networks, such as the Internet data network, a UMTS mobile terminal system, etc., wherein the wireless terminal MT1–MT4 can communicate e.g. with a terminal TE1 coupled with the Internet network.

FIG. 2 shows in a reduced block chart a wireless terminal MT1 according to a preferred embodiment of the invention. The wireless terminal MT1 comprises preferably data processing functions PC as well as communication means COM for setting up a data transmission connection with the wireless network. The wireless terminal can also be designed in a way that a data processing means, such as a portable computer, is equipped for example with an extension card comprising said communication means COM. The data processing functions PC comprise preferably a processor 2, such as a microprocessor, microcontroller or the like, a keyboard 3, a display means 4, memory means 5, and connection means 6. Furthermore, the data processing functions PC can comprise audio means 7, such as a speaker 7a, a microphone 7b, and a codec 7c, wherein the user can also use the wireless terminal MT1 for the transmission of e.g. speech. Information intended to be transmitted from the wireless terminal MT1 to the local area network is transferred preferably via the connection means 6 to the communication means COM. In a corresponding manner, information received from the local area network 1 into the wireless terminal MT1 is transferred to the data processing functions PC via said connection means 6.

The communication means COM comprise e.g. a high-frequency part 8, an encoder 9, a decoder 10, a modulator 20, a demodulator 21, a control means 11, and a reference oscillator 12. Moreover, the communication means COM have a memory 13 for example to form the transmission and reception buffers required in the data transmission. The encoder 9 performs the encoding of the information contained in the data frames, wherein the encoded information is modulated in the modulator 20. The modulated signal is led into the high-frequency part 8, from which the radio-frequency signal is transmitted on a communication channel CH (FIG. 1). In a corresponding manner, the encoded information received from the communication channel and demodulated in the demodulator is restored in the decoder preferably into a data frame format. The reference oscillator 12 is used to perform the required timings to synchronize the transmission and reception with the transmission and reception of the access point. The reference oscillator 12 can also be used to generate the timing signals of the control means 11. It is obvious that the frequency generated by the reference oscillator 12 cannot be used as such for setting the channel frequency and for generating the timing signals of the control means 11, wherein in practical applications frequency modulating means (not shown) are used for modulating the frequency of the reference oscillator 12 into frequencies required in the radio part and into a frequency applicable for controlling the operation of the control means 11.

In a corresponding manner, the access point AP1 (FIG. 3) comprises first communication means 15, 23–26 for setting up a data transmission connection into the wireless terminals MT1–MT4. According to the invention, the wireless local area network 1 can also be implemented as an internal local area network with no connection to external data networks. Thus, it may suffice to have only one access point AP1, with which the wireless terminals MT1–MT4 of the local area network communicate. In the wireless local area network, a data transmission connection 16 is preferably arranged from one or more access points AP1, AP2 to a data processor S which is generally called a server computer or shorter a server. Such a server comprises data files, application software of a firm, etc. in a centralized manner which is known per se. The users can thus start applications installed in the server S via the wireless terminal MT1. In addition, the server S or the access point AP1 can comprise second communication means 17 for setting up a data transmission connection to another data network, such as the Internet network or a UMTS mobile communication network.

The communication means for the access point AP1, AP2 comprise one or more oscillators 22 for generating the required frequencies, an encoder 23, a modulator 24, a decoder 25, and a demodulator 26, as well as a high-frequency part 15, which are known per se.

Each access point AP1, AP2 and wireless terminal MT1–MT4 is allocated an identifier, wherein the access point AP1, AP2 is always aware of the wireless terminals MT1–MT4 coupled to the access point AP1, AP2. In a corresponding manner, on the basis of the identifications the wireless terminals MT1–MT4 distinguish the frames transmitted by different access points AP1, AP2 from each other. These identifiers can also be used in such a situation in which the connection of the wireless terminal MT1–MT4 is transferred from one access point AP1 to another access point AP2, e.g. as a result of fading of the connection.

For communication, the wireless terminal MT1 must be coupled to a data transmission connection in the local area network 1. This can be performed advantageously by starting in the wireless terminal MT1 a network controller or a corresponding application program equipped with program codes for coupling into the local area network 1 as well as for data transmission between the wireless terminal MT1 and the local area network 1. In connection with starting the network controller, the necessary measures are taken e.g. to set the functional parameters of the communication means COM of the wireless terminal. Thus, the receiver of the communication means COM starts to receive signals on a channel frequency of the local area network. If a signal is not detected within a given time, the channel to be listened to is changed. At the stage when a signal is detected on a channel frequency listened to, the signal received by the receiver of the communication means COM is demodulated and led to be decoded, wherein the information transmitted in the radio signal can be found out, as known. From this decoded signal, which is preferably stored in the receiving buffer in the memory 13 of the communication means, the identifier of the BCCH control field of the data frame is searched for. This identifier of the BCCH control field is in a certain location in the data frame, wherein after the identifier has been found, the location of the BCCH control field is known in the receiving buffer. The BCCH control field contains e.g. the identifier (AP ID) of the access point that transmitted the data frame, the number of the data frame, and information on the length, modulation method and coding of the FCCH control field.

The wireless terminal MT1 is synchronized with the transmission of this access point AP1. The wireless terminal MT1 requests for connection set-up by transmitting an RACH message to the access point AP1 at a moment of time allocated for this purpose. For example, in the frame structure according to FIG. 1b, the RACH message can be transmitted after the transmission and reception time slots, before the next BCCH control field. In the message, the wireless terminal MT1 transmits data on e.g. the requested quality of service and connection type, such as multimedia connection, data connection, speech connection. The connection type and quality of service affect for example the number of time slots TS1–TSn to be allocated for the connection.

The access point controller AC1 examines the message and finds out, e.g. from a resource allocation table or the like, the resources available at the access point AP1 at the moment. If there are sufficient resources for setting up a connection corresponding to the requested quality of service, the access point controller AC1 allocates the required resources for the connection. Transmission and reception strings (buffers) for the connection are formed in the memory means 14 of the access point controller AC1, to be used for temporary storage of received packets and temporary storage of packets waiting for transmission. Furthermore, each connection is allocated a connection identifier, wherein the transmission of the data to the correct target is secured. Also, a priority can be selected for the connection, wherein resources, such as transmitting and receiving time slots, that are free at the time are allocated in a priority order. Depending on e.g. the need for resources, a different number of time slots TS1–TSn in the data field of the data frame FR can be allocated for different connections. Also the number of time slots allocated for transmission and for reception can be different even in the same connection, as already mentioned in this description. Moreover, the number of the time slots allocated for connections can vary according to the frame, wherein in each data frame FR the number of time slots TS1–TSn allocated for the connection can range from zero to the maximum. the location of the transmitting and receiving time slots contained in the data frame is preferably conveyed in the FCCH control field.

After the connection to the local area network 1 has been set up, it is possible to start the data transmission between the server S and the wireless terminal MT1 preferably with a protocol, such as the IP (Internet Protocol). In FIG. 5, this data transmission is illustrated with protocol stacks. Of the protocol stacks, the application layer AL, network layer NL, logical link layer LL, and physical layer PHY are presented. On the radio channel, i.e. between the access point AP1 and the wireless terminal MT1, the logical link layer of the protocol stack comprises in this preferred embodiment a lowermost MAC layer (Media Access Control), which takes care of the use of the radio channel in communication between the wireless terminal MT1 and the access point AP1, such as the allocation of channels in the transmission and reception of packets. This description is primarily involved with the data frames FR of the MAC layer.

A scheduler 18 formed in the access point controller AC1, AC2 performs e.g. the timing of the data frames FR in the access point AP1, AP2 and the allocation of transmission and receiving time slots for packets of active connections waiting for transmission. The scheduler switches the receiver of the access point to receive the radio signal for the time allotted for the RACH field of the frame. Thus, the wireless terminals MT1–MT4 can transmit not only the above-presented connection set-up request but also various measuring information to the access point.

According to an advantageous embodiment of the invention, the wireless terminal MT1 is also provided with status buffers C_ST and D_ST as well as a storage buffer P_ACK for storing packet receiving data in a way known per se. The first status buffer C_ST is used for storing the receiving status of the data frame control fields C, such as BCCH and FCCH. The second status buffer D_ST is used in a corresponding way for storing the receiving status of the data field D. Data stored in these status buffers is used in the setting up of an acknowledgement message. The status buffers C_ST, D_ST are implemented preferably in the memory means 13 of the communication means of the wireless terminal MT1, or possibly by using the registers of the control means 11 (not shown), which is known per se. The size N of the status buffers can be set to be such that a known quantity of information can be stored in the status buffers, e.g. the status data of the three last received data frames. It is obvious that the present invention can also be implemented by using longer or shorter status buffers than those presented herein.

The following is a description of the operation of the method according to an advantageous embodiment of the invention in a communication system 1 of FIG. 1a, by using as an example a wireless terminal MT1, with reference to the flow charts of FIGS. 6a–6i and the data frames shown in FIG. 4a.

In the wireless terminal MT1, certain initializing measures are taken in connection with starting (block 601 in FIG. 6a) e.g. to set the initial values of various variables. This is illustrated by block 602 in the flow chart of FIG. 6a. In the wireless communication device MT1 according to the invention, at least one power level reference value RX_Thr is also determined to be used in finding out the reason for errors detected in the communication, that is, whether the error was possibly caused by fading of the signal or by external interference. This power level reference value RX_Thr is preferably stored in the wireless terminal MT1 and also in the access point AP1, if necessary. The power level reference value RX_Thr can also be transmitted from the access point AP1 to the wireless terminal MT1 e.g. at the stage when the wireless terminal MT1 sets up a connection to the local area network 1, wherein the wireless terminal MT1 uses the reference value RX_Thr received. This reference value RX_Thr is set preferably so that one reference value is determined for each modulation and coding method in such a way that when the strength of the received signal is substantially equal to the reference value, the error probability is the limit value pre-required in the standard. If the signal strength decreases below the reference value RX_Thr, the number of errors will increase. Said limit value is e.g. a value at which, according to the standard applied in the communication system, all the receivers to be used in the communication system must be able to achieve an error probability in accordance with the limit value at the level of the received signal according to the reference value RX_Thr.

It is assumed that the wireless terminal MT1 has an active data transmission connection to the access point AP1 on a channel used by the communication system and that the wireless terminal MT1 is synchronized with the data frames of the access point AP1 (block 603). The packets of this data transmission connection in the different frames are indicated with the reference PDU1. Each packet is preferably numbered to maintain the correct order of the packets at the receiving stage. This is necessary particularly in such situations in which incorrectly received packets are retransmitted. The data frames of FIG. 4a also contain data packets of other connections, which are indicated with the references PDU2 and PDU3. In this example, these other connections are connections of one or several different terminals MT2 to the same access point AP1. In packets of different connections, the same numbers can be used, because the time slot used in the transmission of the packet indicates the connection to which the packet in question belongs.

At intervals, the wireless terminals MT1–MT4 coupled to the local area network measure e.g. the signal strengths on the channel frequency at which the wireless terminal MT1–MT4 communicates with the access point AP1, AP2, as well as on adjacent channel frequencies. The measurement is used to calculate e.g. the power average which is transmitted to the access point AP1 to which the wireless terminal is coupled. The access point AP1 can use this data e.g. in channel change situations to select the channel. If a failure in the reception of the channel fields D was due to the measurements, the status at the corresponding data frame in the first status buffer C_ST is advantageously set to OK and the status in the second status buffer D_ST is advantageously set to R, i.e. no errors (blocks 604 and 605 in FIG. 6a). In this way the error analysis is not distorted by the measurements.

When the wireless terminal MT1–MT4 is not taking measurements, but data frames are received, preferably a scheduler implemented in the application software of the control means 11 of the wireless terminal examines if the BCCH control field is in turn for transmission (block 606). Thus, the control means 11 couples at the beginning of the data frame the high-frequency part 8 to receive the signal of the BCCH control field (block 607 in the flow chart of FIG. 6a) and initializes certain variables to their initial values, such as the control field error flag C_ERR to the OK state, e.g. to the logical 0 state (block 608, FIG. 6b). At the same time, the control means 11 sets the operation of the demodulator DEM and the decoder 10 to correspond to the modulation and coding to be used in the transmission of the BCCH control field, e.g. at the BPSK-½ (Binary Phase Shift Keying) coding ratio ½, that is, two bits being generated for each bit to be transmitted. During reception (block 609), the radio part 8 is used to measure the power level of the received signal, preferably the average power level or possibly the power level of a possible preamble part (block 610). The received BCCH control field is stored in the receiving buffer, and preferably the control means 11 calculates a checksum CRC from the received information (block 611). Subsequently, the control means 11 compares this calculated checksum with the checksum received in the BCCH control field (block 612). If the checksums match, the operation is continued in this embodiment in block 604. If the checksums do not match, the received BCCH control field is incorrect. In this case the control means 11 sets the control field error flag C_ERR to the second state, e.g. the logical 1 state (block 613). Moreover, the possible cause to the error is examined (flow chart 614 in FIG. 6j). Thus the control means 11 compares the measured power level RX_Lev of the received signal with the predetermined reference value RX_Thr (block 615). If the signal level RX_Lev is smaller than the reference value RX_Thr, the cause of the error is marked as fading of the signal and the fading error counter F_CTR is increased by one (block 616). In other cases, the error was probably caused by interference, wherein the interference error counter I_CTR is increased by one (block 617).

In block 618 it is examined if the FCCH control field is in turn for transmission, wherein the reception of the FCCH control field is started (block 619). To receive the FCCH control field, the operation of the demodulator DEM and the decoder 10 are changed to comply with the modulation and coding to be used in the transmission of the FCCH control field, if they differ from those used in the FCCH control field (block 620, FIG. 6c). During reception (block 621), the radio part 8 is used to measure the power level of the received signal, preferably the average power level or the power level of a possible preamble part (block 622). The received FCCH control field is stored in the receiving buffer, and preferably the control means 11 calculates the checksum CRC from the received information (block 623). Subsequently, the control means 11 compares this calculated checksum with the checksum received in the FCCH control field (block 624). If the checksums match, the operation is continued in this embodiment in the block 626. If the checksums do not match, the received FCCH control field is incorrect. In this case the control means 11 sets the control field error flag C_ERR to the second state, e.g. in the logical 1 state (block 625).

In block 626 it is examined if there are still unreceived parts in the FCCH control field, wherein the operation returns to the block 621 to take the above-mentioned measures for the next part. When the whole FCCH control field has been received, the status of the error flag C_ERR is examined in block 627. If it is OK, the status of this data frame is set in the first status buffer C_ST as OK (block 629). In other cases, the status is set as NOT OK (block 628). Furthermore, the possible cause of the error is examined. Thus the control means 11 compares the measured power level RX_Lev of the received signal with the predetermined reference value RX_Thr (block 615). If the signal level RX_Lev is smaller than the reference value RX_Thr, the cause of the error is marked as fading of the signal and the fading error counter F_CTR is increased by one (block 616). In other cases, the error was probably caused by interference, wherein the interference error counter I_CTR is increased by one (block 617).

After reception of the control fields C, it is preferably examined on the basis of the information transmitted in the control fields C and the timings of the scheduler, whether there is any packet of the data field D belonging to the active connection of this wireless terminal MT1 that is in turn for transmission (block 630). The reception of the packets is described in the flow charts of FIGS. 6d and 6e.

To receive packets and to examine the incorrectness of the reception (block 631), auxiliary variables are set in their initial values, preferably the fading error counter F_CTR and the interference error counter I_CTR are set to the value 0 (block 632) and the packet reception data P_ACK is set to the value N indicating not received status. Moreover, the demodulator and the decoder are set to comply with the modulation and coding to be used in the transmission of packets.

In the reception of packets (block 633), the power level RX_Lev of the received signal is also measured, preferably the average level or the level of a possible preamble part (block 634). In some cases, it is possible to transmit several packets in succession so that the preamble is transmitted first, wherein the power level RX_Lev can be determined by measuring the signal strength of each packet, or the signal strength of the preamble part. In this latter alternative for examining successive packets, the same power level is used as the value for the signal level RX_Lev.

The received packet is stored in the receiving buffer, and preferably the control means 11 calculates the checksum CRC from the received information (block 635). Subsequently, the control means 11 compares this calculated checksum with the checksum received in the packet (block 636). If the checksums match, the receiving data of the received packet is set in block 637 to the value R which in this embodiment corresponds to a faultlessly received packet. In practical applications, this value R can be e.g. a binary digit of 1 bit, wherein the bit value is preferably set as 1. Correspondingly, the value N is preferably a binary digit of 1 bit, whose value is set as 0. It is obvious that also other representations can be used. However, if the checksums do not match, the receiving data is not changed for this packet, i.e. the status remains as not received. In this case the control means 11 compares the measured power level RX_Lev of the received signal with the predetermined reference value RX_Thr (block 615). If the signal level RX_Lev is smaller than the reference value RX_Thr, the fading error counter F_CTR is increased by one (block 616). In other cases, the error was probably caused by interference, wherein the interference error counter I_CTR is increased by one (block 617).

From a faultlessly received packet, the receiving device can examine the possible identification ID of the packet and use this identification ID to set the receiving data in the right location in the storage buffer P_ACK. If the packet could not be faultlessly received, the packet identification ID is not necessarily known to the receiving device. Instead, it is known in which time slot (transmission slot) the packet was transmitted. In FIG. 4a, blocks 403, 404 and 405 illustrate as examples the error types defined for packets PDU1 of one data transmission connection. The letter F indicates that the error type defined for the packet PDU1 received in the transmission slot in question (time slot, it the TDMA system is involved) is fading. Correspondingly, the letter I indicates that the error type defined for the packet PDU1 received in the transmission slot in question is interference. Moreover, the letter R indicates that in the transmission slot in question the packet PDU1 was received faultlessly, wherein its identification ID and/or serial number (e.g. #5, #6, #7, #9–#12) is known to the receiving device.

Next, in block 638, the packet index counter M is increased preferably by one and it is examined if all the packets transmitted in the data frame in question to this wireless communication device were received (block 639). If there are packets still unreceived, the operation is continued from block 633 and the above-presented measures are taken for the packet to be received next. If there are no more unreceived packets of the data frame, the next step is to move on to update the status data (block 640, FIG. 6e).

For updating the status data, the probable cause for errors is examined preferably as follows. First, it is examined if the value of the fading error counter F_CTR is 0 (block 641).

If it is, fading was not the cause for the errors, wherein it is examined if the value of the interference error counter I_CTR is also 0 (block 642), wherein no errors were detected in the reception of the packets. In this case, the value of the second status buffer D_ST is set to R (block 643), which refers here to faultlessly received packets of the data frame. If the value of the interference error counter I_CTR is not 0, the value of the second status buffer D_ST is set as I (block 644) which indicates here that the errors were caused by interference. If the value of the fading error counter F_CTR is not 0, the value of the fading error counter F_CTR is compared in block 645 to the value of the interference error counter I_CTR. If there were more errors caused by interference than by fading, the value of the second status buffer D_ST is set to I (block 644). In other cases, the value of the second status buffer D_ST is set to F (block 646), that is, the most probably cause for the errors was fading. After examining the packets, the operation moves on to block 647 in the flow chart, where the data frame counter K is increased by one. Said value F is e.g. the binary digit 01 and said value I is e.g. the binary digit 10.

In block 648 (FIG. 6a) it is examined if the number of data frames corresponding to the size N defined for the status buffers has been received, or if an acknowledgement message is otherwise due for transmission, e.g. the access point AP1 requests the wireless terminal MT1 to transmit an acknowledgement message. If not, the operation moves on to the reception of the next data frame (block 604) when it is due. Next, the data frame to be received is subjected to the above-presented measures. After the set number of data frames has been received and examined, the operation moves on to set up an acknowledgement message (block 649, FIG. 6f).

Figure 6A:
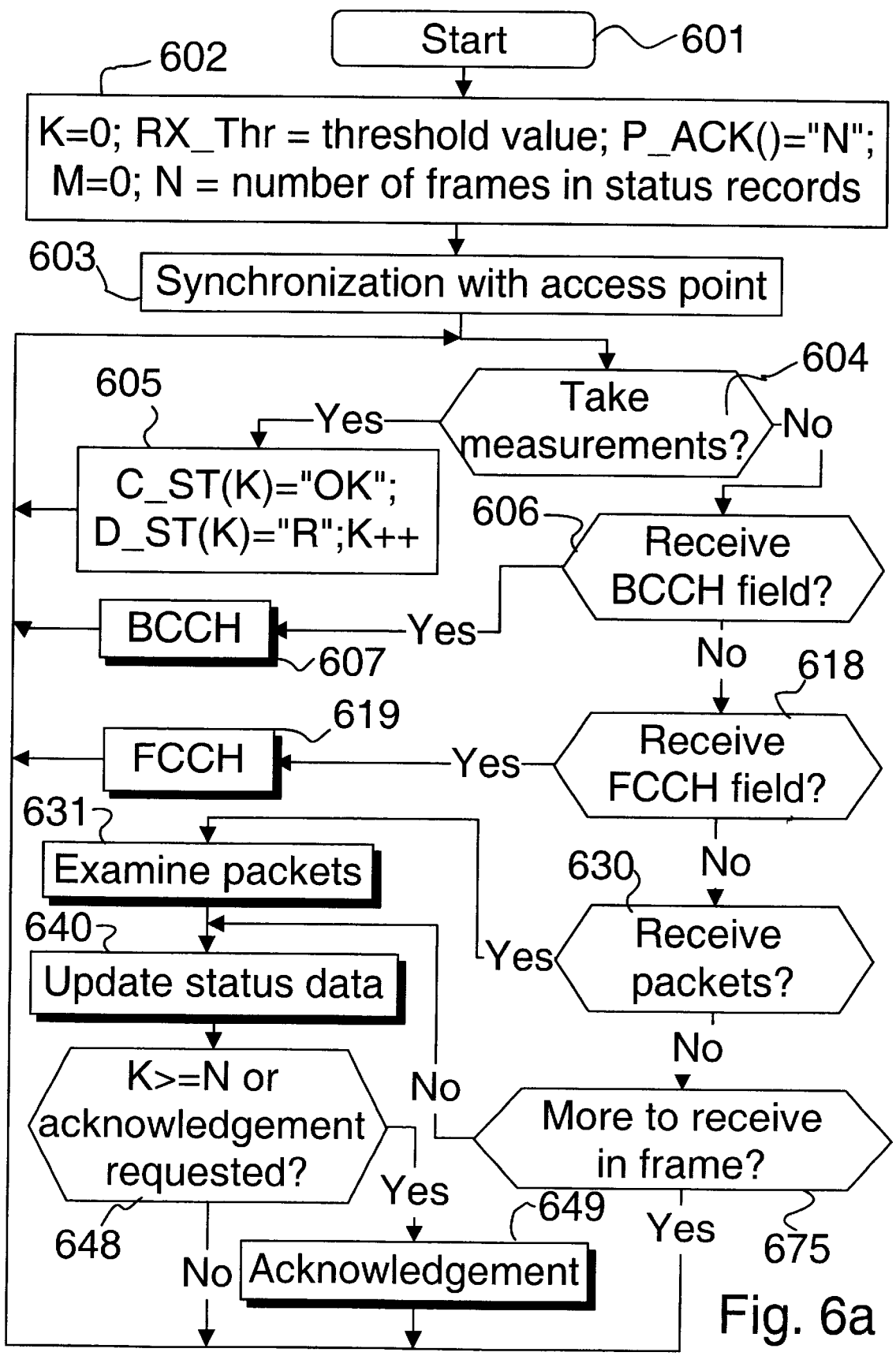
Figure 6B:
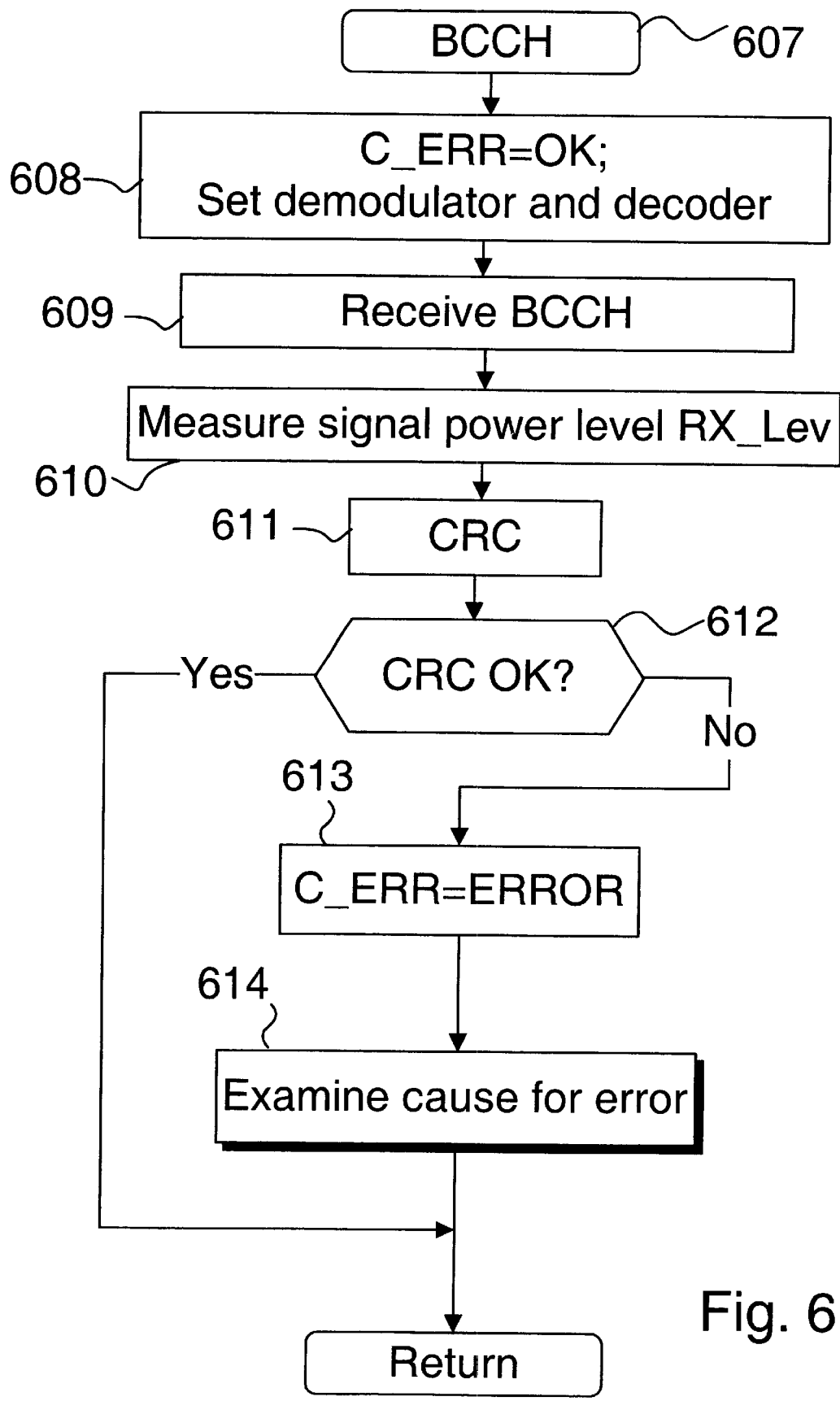
Figure 6C:
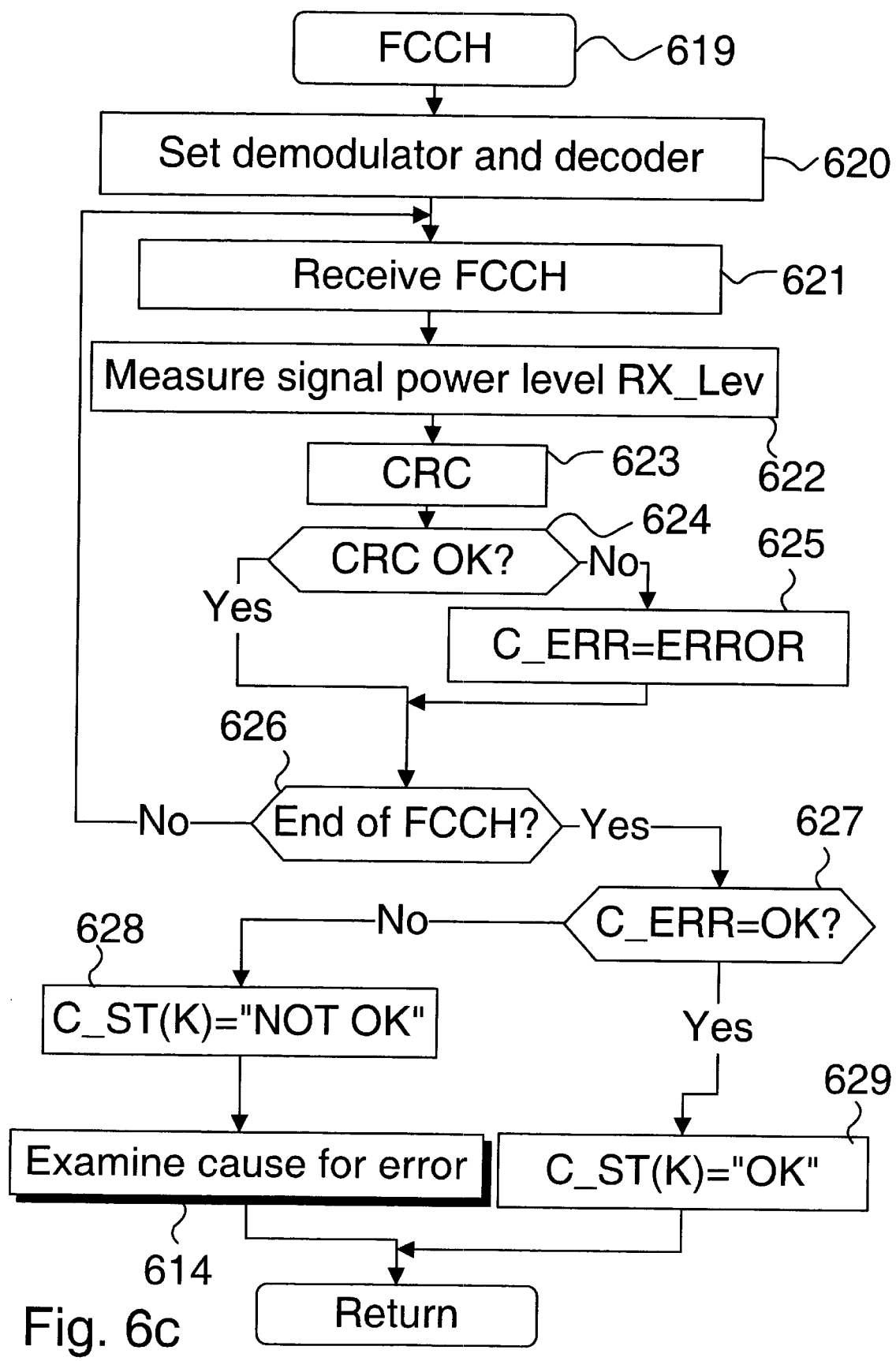
Figure 6D:
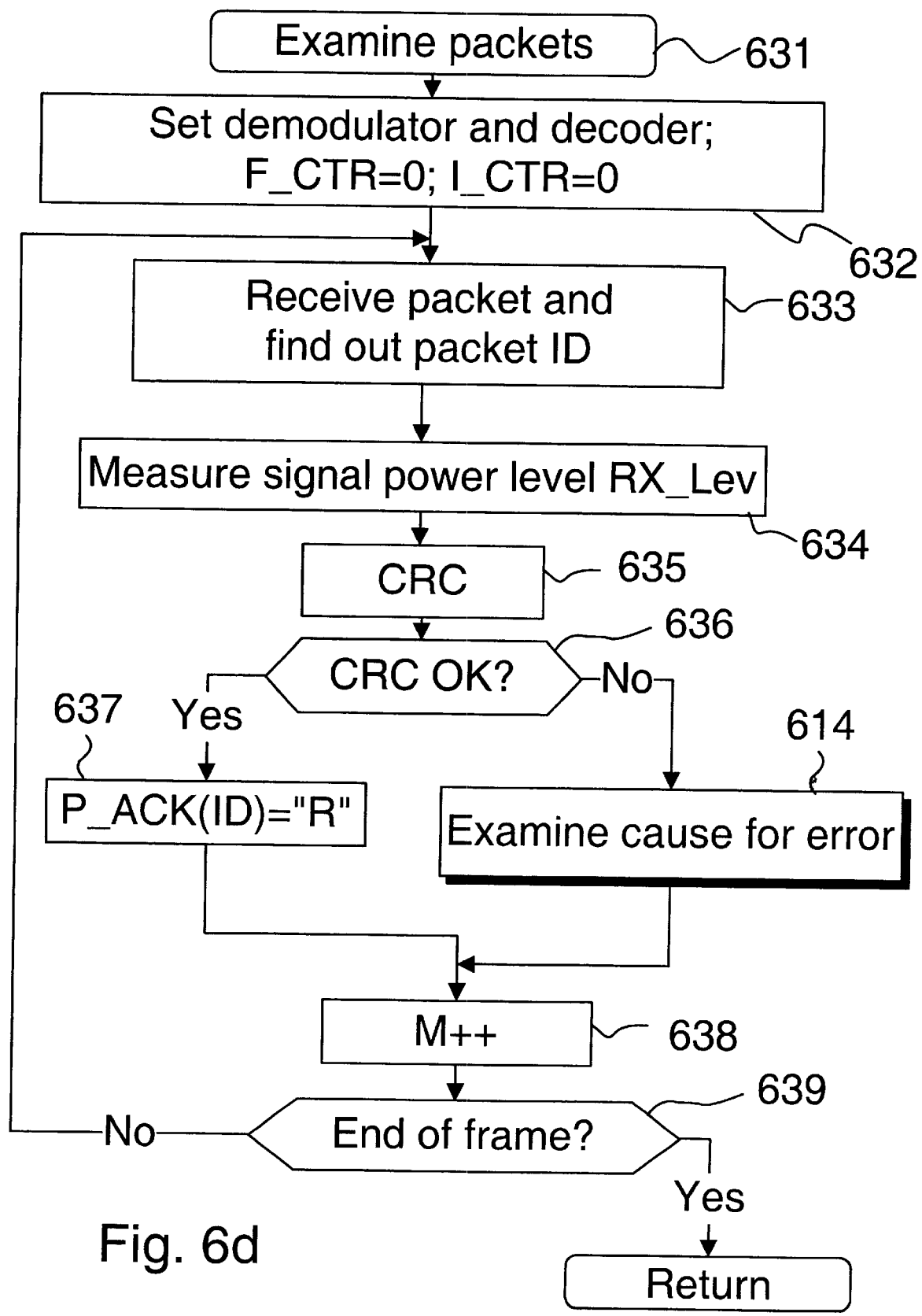
Figure 6E:
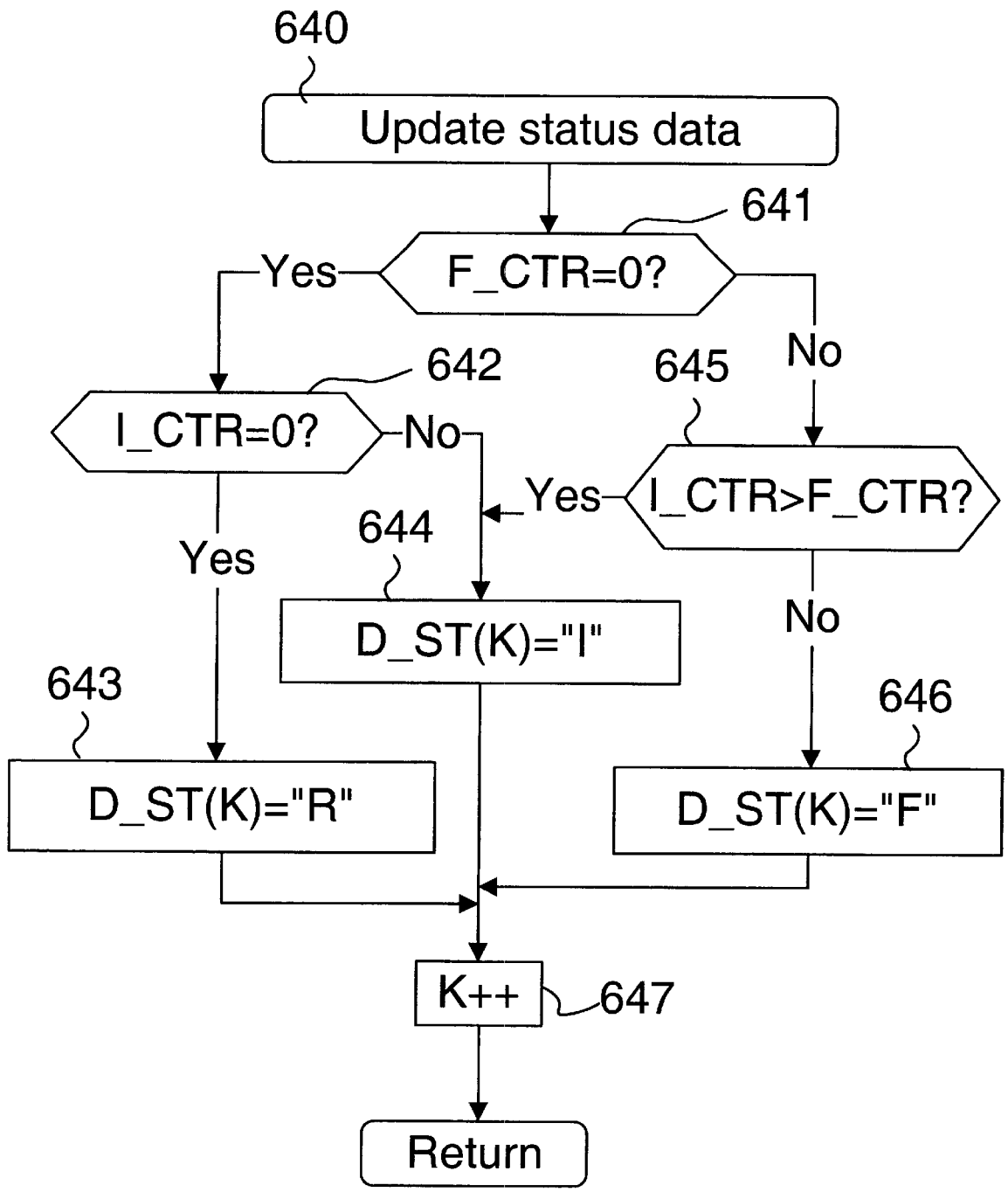
Figure 6F:
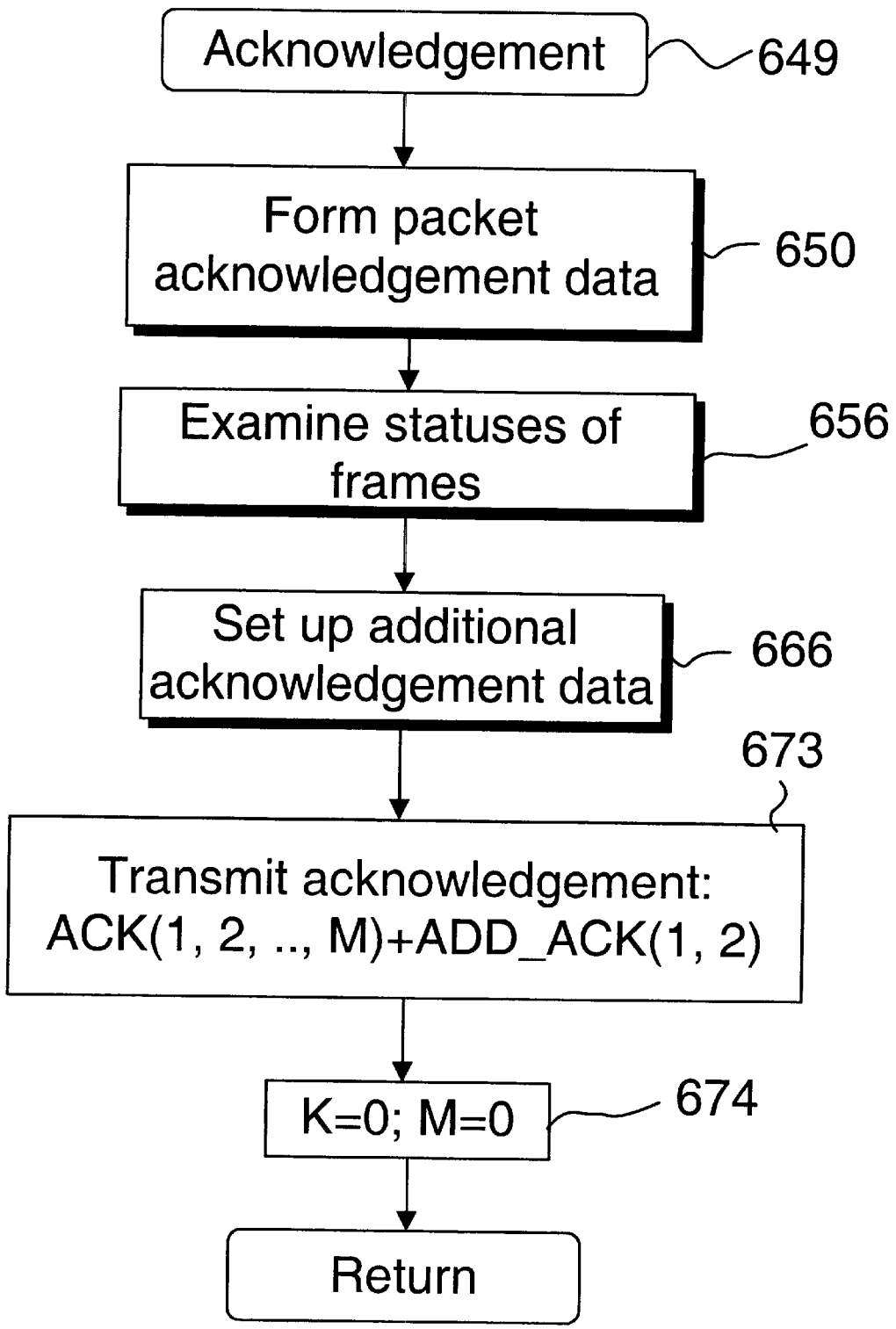
Figure 6G:
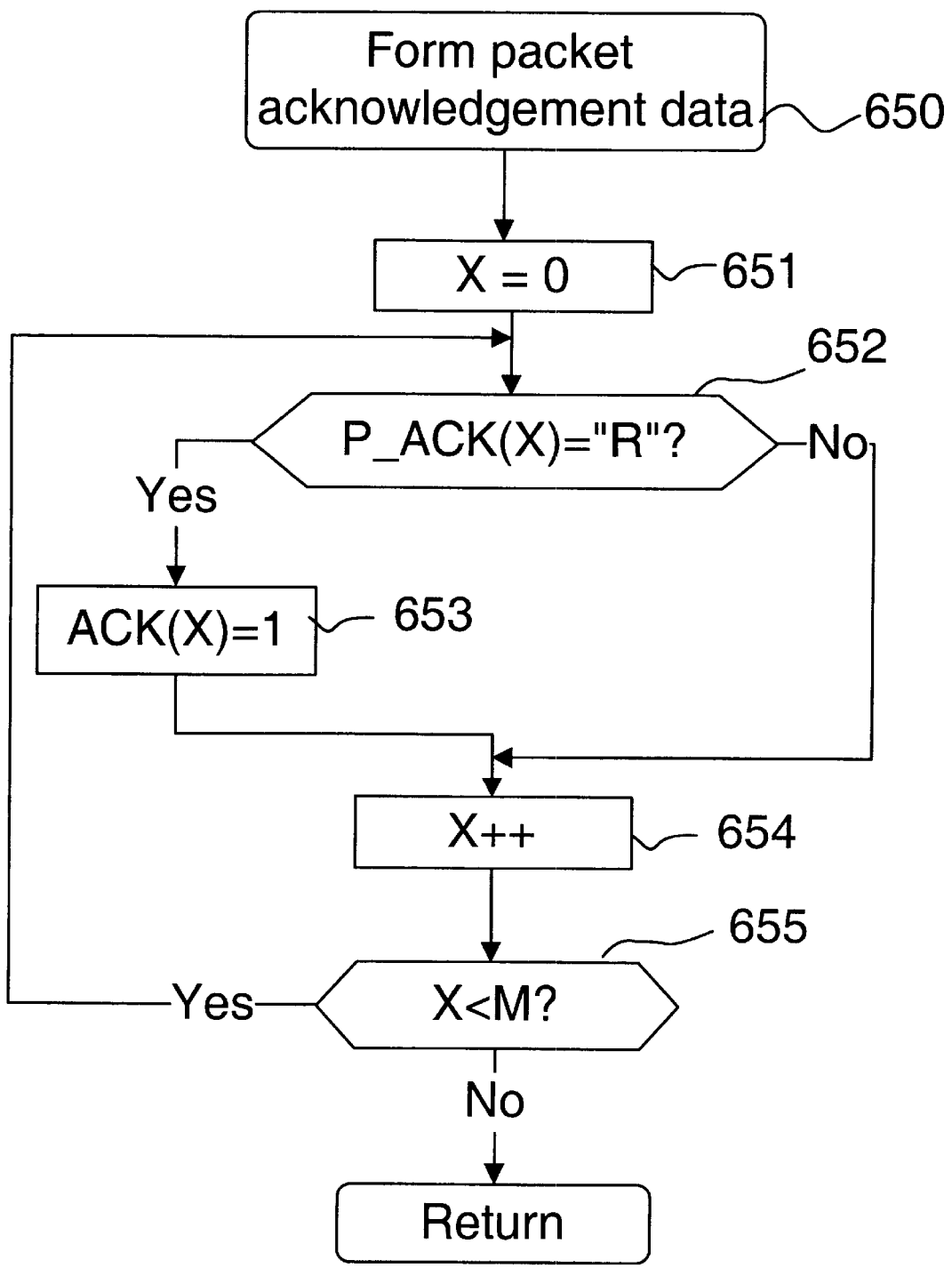
Figure 6H:
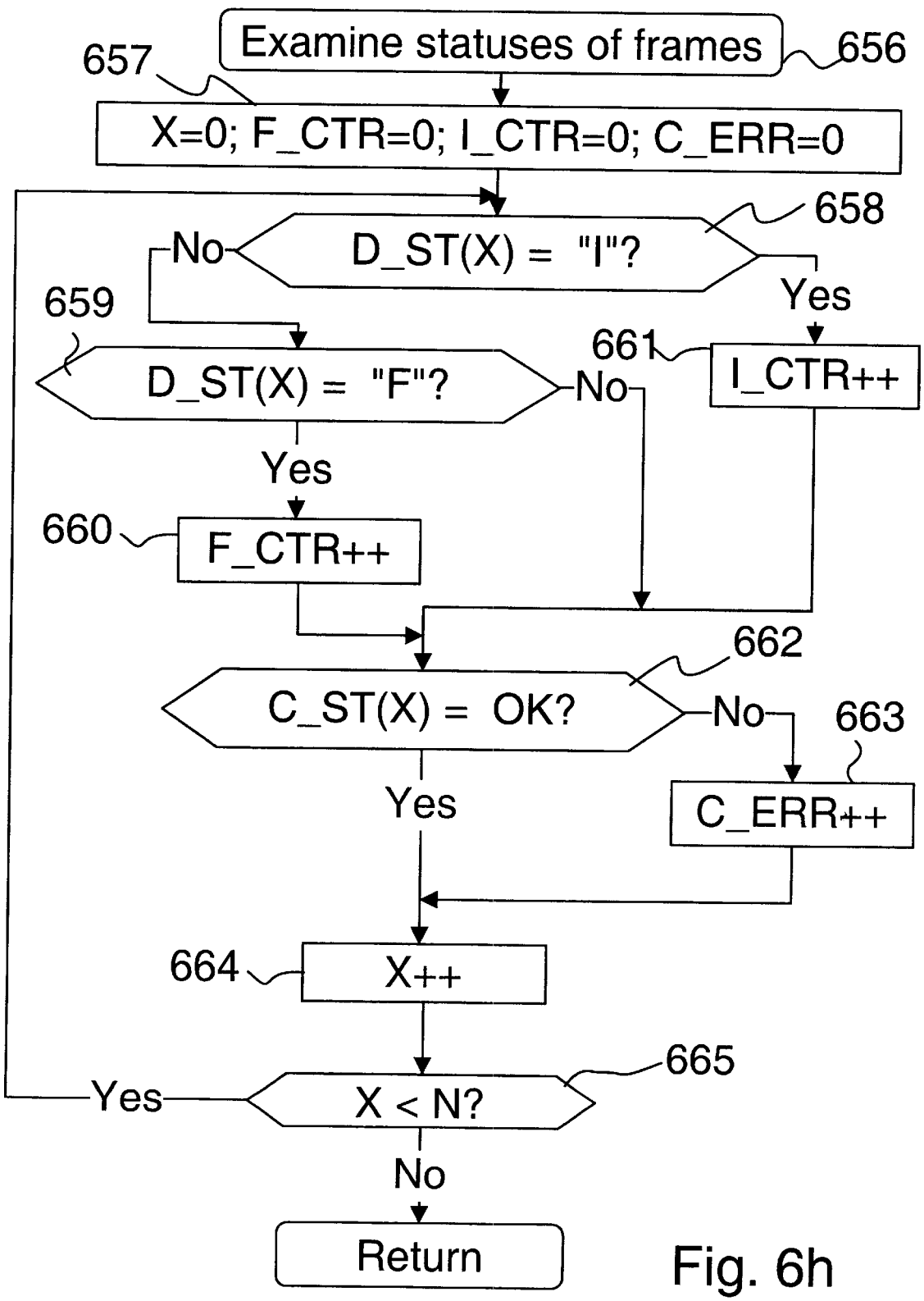

To set the acknowledgement message, e.g. the frame-specific acknowledgement data ACK is set up (bit map) in a way known per se (block 650, FIG. 6g). This acknowledgement data ACK is e.g. a binary digit in which each bit corresponds to the acknowledgement data of one packet. The default value is the first value, e.g. the logical 0 state, which in this preferred embodiment indicates that the frame was not received. The bit is set preferably to the value 1 for a frame which has been faultlessly received (block 652). In other cases, the value of the bit remains 0. In this preferred embodiment, the acknowledgement data of M packets is transmitted in one acknowledgement message. In the flow chart of FIG. 6g, the auxiliary variable X to be used as the frame counter is set in block 651 to the value 0. In block 652, the receiving data of the frame corresponding to the respective value of the auxiliary variable X is examined. At this stage, it is examined if the frame was received incorrectly. In block 654, the value of the auxiliary variable X is increased by one and the above-presented measures are repeated, until all the M packets have been examined (block 655).

After setting up the packet acknowledgement data, the cause for the errors is examined more closely in the different data frames. This is illustrated in the flow chart 656 of FIG. 6h. The cause for the errors is reported by means of additional acknowledgement data ADD_ACK to be transmitted in the acknowledgement message to the access point AP1. To set up this additional acknowledgement data ADD_ACK, the auxiliary variables X, F_CTR, I_CTR, C_ERR are first given the initial values (0), block 657. The auxiliary variable X is used as an index counter to indicate the data of the data frame under examination in the second status buffer D_ST. In block 658, it is examined on the basis of the data stored in the second status buffer D_ST what has been the most probable cause for errors in the packets in the data frame under examination. If the cause was interference (value "I" in the status buffer), the interference error counter I_CTR is increased by one (block 661). If the cause was fading (value "F" in the status buffer), the fading error counter F_CTR is increased by one (blocks 659 and 660). Moreover, it is examined if the control fields C of the data frame in question were faultlessly received. This can be found out by examining the corresponding value of the first status buffer C_ST, i.e. by using the value of the auxiliary variable X as an index (block 662). If the value in the first status buffer C_ST is OK, the control fields were faultlessly received. If the value is not OK, there has been an error in the reception of one or several control fields of said data frame, wherein the control field error counter C_ERR is increased by one (block 663). In block 664 the index counter X is increased by one, and in block 665 it is examined if the status buffers C_ST, D_ST have already been examined.

Figure 6I:
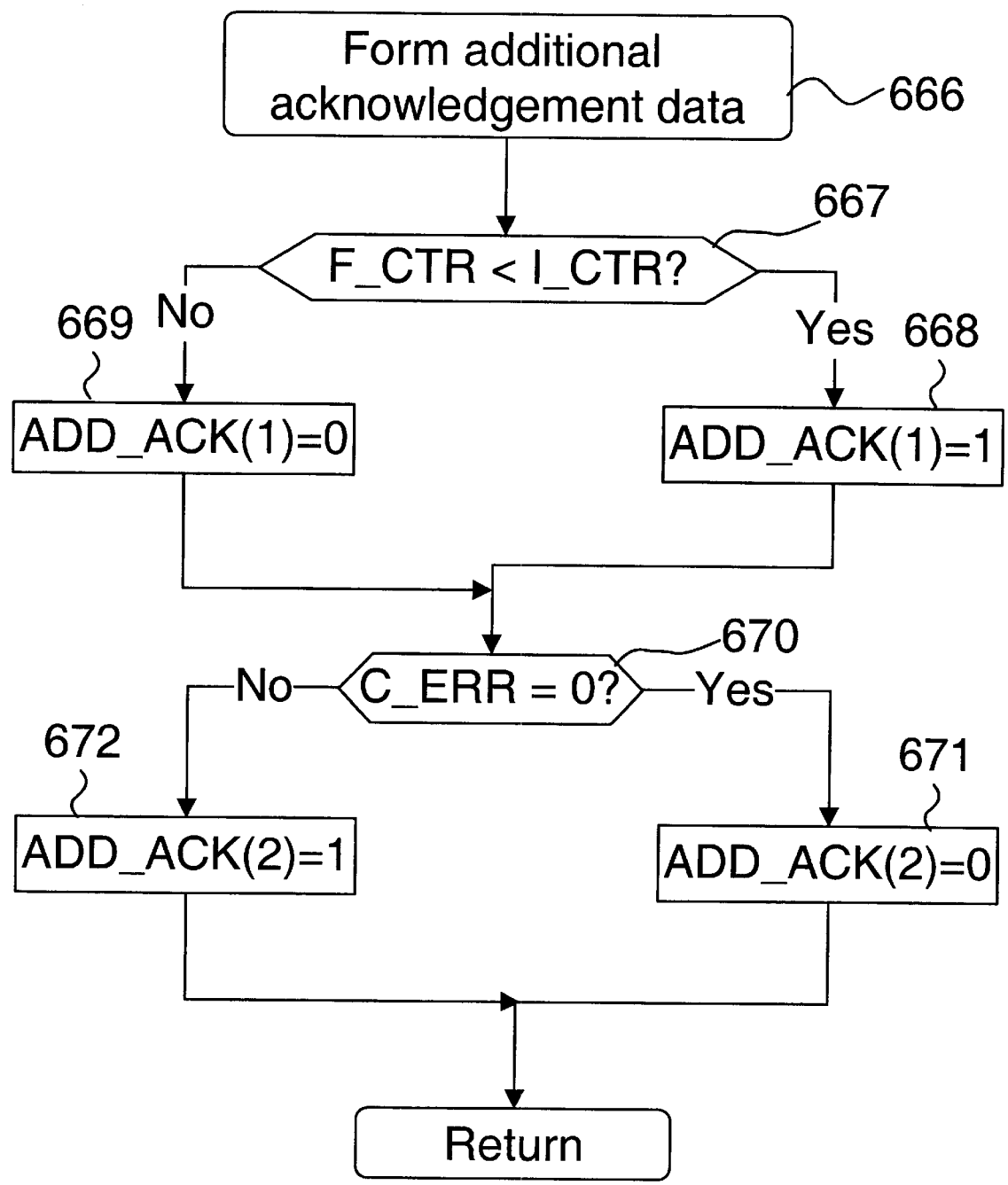
Figure 6J:
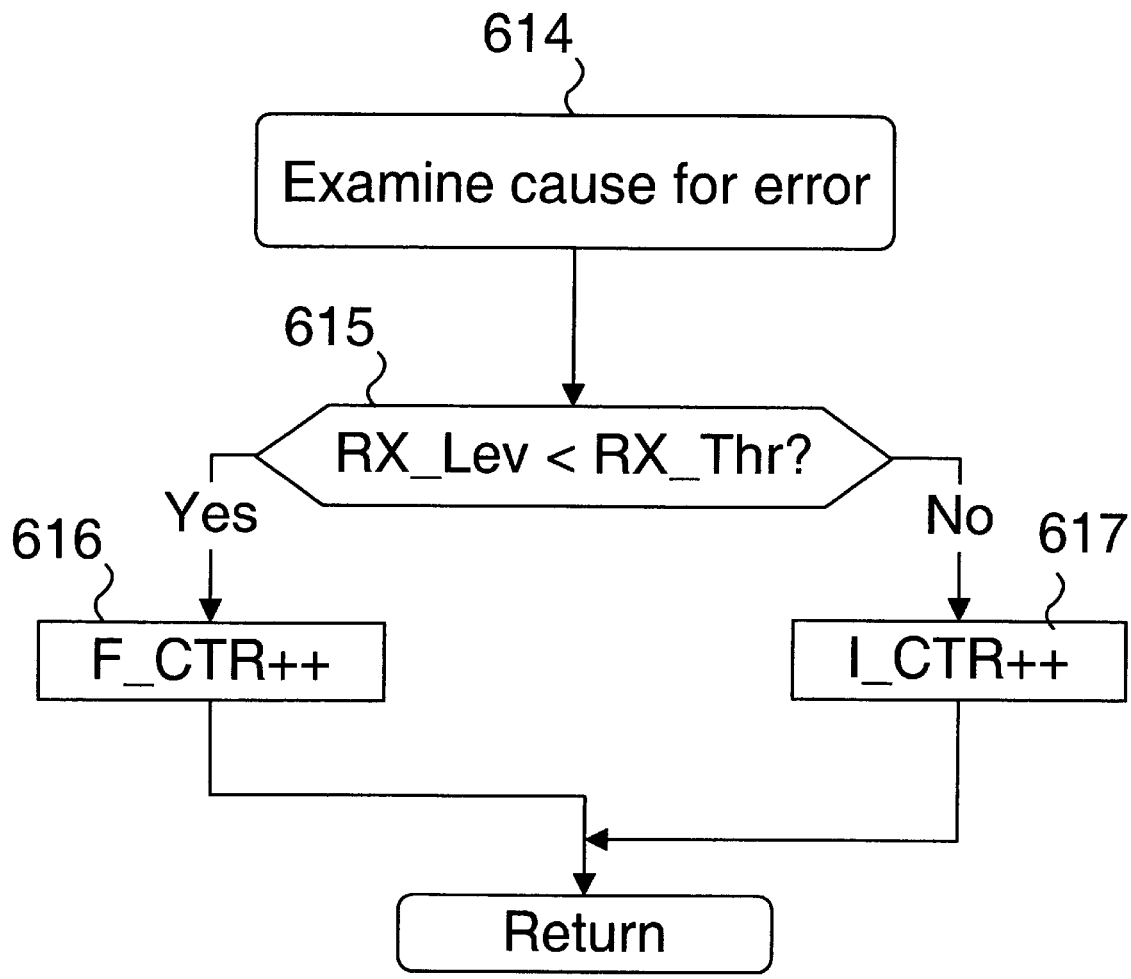

After the data of the status buffers C_ST, D_ST have been examined, the additional acknowledgement data ADD_ACK is set up preferably as follows (flow chart 666 in FIG. 6i). It is examined if the primary cause for errors in the data frames was interference or fading (blocks 667). If there was more interference, the value of the first data field (bit) in the additional acknowledgement data ADD_ACK is preferably set to 1 (block 668); in the other cases the value is set to 0 (block 669). The second data field (bit) is provided with data on whether there were errors in the reception of the control fields. If the value of the control field error counter C_ERR is 0 (block 670), the control fields of all the data frames under examination have been faultlessly received and the value of the second data field is preferably set to 0 (block 671); in the other cases, the value is set to 1 (block 672).

After setting up all the acknowledgement data, the acknowledgement data are transmitted to the access point AP1 (block 673). The data to be transmitted comprises e.g. the acknowledgement data ACK and the additional acknowledgement data ADD_ACK. In this preferred embodiment, after the transmission of the acknowledgement data the auxiliary variables K and M are set to the initial value 0 (block 674).

In the case that e.g. the FCCH control field has not been faultlessly received, it may happen that the wireless terminal MT1 will not receive information on all the packets transmitted in the data frame and intended to be received by said wireless terminal MT1. Thus, to update the status data, it is examined in block 675 if there is still anything to receive in the data frame. If for example the timer detects that the transmission of the data frame has ended, or on the basis of information possibly received in the FCCH control field there are no more incoming packets in this data frame to the wireless terminal MT1, the operation moves on to update the status data in block 640.

At the access point AP1, or in another unit of the communication system used for selecting the channel, the additional acknowledgement data ADD_ACK can be used e.g. in the change of the channel and/or transmission power level to be used in the connection. At access points AP1, a dynamic frequency (channel) selection algorithm is preferably used. By the method according to the present invention, it is possible to avoid unnecessary channel changes, because the access point AP1 can examine the cause for the reception error. If the cause is fading, the access point AP1 will not conduct a channel change, because the fading phenomenon will probably affect the quality of the connection also on other channels of the communication system. Instead, an increase in the transmission level in such a situation may raise the signal strength in the wireless terminal MT1, wherein the error probability will be reduced. If the errors are caused by interference, such as another radio device, a channel change may improve the quality of the connection. Particularly in such situations in which the cause for the errors is another radio device of the same communication system transmitting on the same channel, such as a wireless terminal or an access point, interference will at a great probability be significantly weaker on other channels.

The probability of transmission errors can be reduced by link adaptation irrespective of the fact whether the primary cause for disturbance is fading or interference. However, link adaptation requires increasing the bandwidth. Thus, it is important to find out if link adaptation can achieve an improvement in the quality of the connection in each disturbance situation. In the method according to the invention, this can be done advantageously by examining if there were errors in the reception of the control fields C of the data frames, or only in the reception of the packets. If the wireless terminal MT1 has received the control fields faultlessly, link adaptation can probably improve the quality of the connection, wherein the access point AP1 can e.g. increase the bandwidth. If errors were also detected in the reception of some control fields, link adaptation cannot improve the quality of the connection. In such a situation, increasing the bandwidth would unnecessarily reserve data transmission capacity from other wireless terminals and increase the general interference level.

FIG. 4b shows as an example the way of setting up, on the basis of receiving the data frames FR of FIG. 4a, status data in said status buffers C_ST, D_ST, in the packet status data storage buffer P_ACK, and corresponding acknowledgement data ACK, ADD_ACK. In FIG. 4b, the reference numeral 401 indicates the frame numbers of data frames transmitted from the access point AP1, and the reference number 402 indicates the numbers of packets relating to the active connection of the wireless terminal MT1. Furthermore, FIG. 4b shows data stored in the status buffers C_ST, D_ST, P_ST, the acknowledgement data ACK as well as the additional acknowledgement data ADD_ACK set up by the method according to the invention.

In the description above, the transmission of an acknowledgement message was presented after every third data frame; however, it is obvious that the invention is not limited solely to this embodiment. The acknowledgement message can also be transmitted upon request. Moreover, the interval for transmitting the acknowledgement message does not need to be the same as the size defined for the status buffers. The acknowledgement message can be transmitted e.g. after every other data frame, or after every eighth packet received in the wireless terminal MT1, irrespective of the number of data frames in which the packets were transmitted. In these alternatives, too, the additional acknowledgement data can always be set up in connection with the transmission of the acknowledgement message.

With the length of the status buffers, it is possible to affect e.g. how quickly the additional acknowledgement information is changed with a change in the conditions. The more frames the additional acknowledgement data is formed of, the slower the changes can be seen in the acknowledgement data. On the other hand, temporary disturbances of short duration do not cause unnecessary changes e.g. in the frequency or power level to be used in the connection.

The operations of the method according to the invention can be implemented in the wireless terminal MT1 preferably in the application software of the control means 11 of the communication means, but it is also possible to use e.g. the processor 2. At the access point AP1, the examination of the acknowledgement message and possible measures to change the connection can be implemented preferably in the access point controller AC1.

The appended FIG. 4a shows some data frames FR as examples. The data frames FR comprise control fields C, such as RACH, BCCH and FCCH, as well as a data field D with time slots TS1–TSn for the transmission of packets of different connections. In this example, the time slots TS1–TSn comprise transmission time slots and receiving time slots.

The invention can also be applied in other systems than the HIPERLAN/2 system used in this example. Also other than time division multiple access (TDMA) systems are feasible, for example a code division multiple access (CDMA) or frequency division multiple access (FDMA) system, or a combination of these different systems. Thus, in the code division multiple access system, the feature corresponding to the time slots (transmission slot) is a code sequence, and in the frequency division multiple access system a frequency sequence.

It has been presented above that the wireless terminal MT1 examines the cause for an error and indicates it to the access point AP1; however, the invention can also be applied in such a way that the access point AP1 or a corresponding unit in the communication system examines the cause for the error on the basis of the signal received and reports it to the wireless terminal MT1. This is applicable particularly in such communication systems in which the channel is selected by the wireless terminal MT1. One example of such a system is the DECT system.

In the above-described example according to a preferred embodiment of the invention, two error types were used, namely fading and interference. In a corresponding way, the method of the invention can also be applied to examine other error types and to report them to the unit of the communication system that selects the channel. Thus, in the examination of the error type, different criteria can be used than the signal power level as presented here. Also, there can be more than two error types.

One error type can also be inter symbol interference (ISI) or the fact that the receiving device MT1–MT4, AP1, AP2 was not ready for reception, e.g. for the reason that the receiver 8, 15 of the receiving device was taking measurements. Inter symbol interference can be examined e.g. from the impulse response of the communication channel by techniques known per se. Symbols transmitted in a situation of inter symbol interference are partly overlapping at the receiving stage, wherein the information transmitted cannot be necessarily decoded correctly in the decoder 10, 25.

Thus, in the method according to a preferred embodiment of the invention, a comparison is first made between the signal strength RX_Lev and the reference value RX_Thr. If the signal strength RX_Lev is smaller than the reference value RX_Thr, the error type is marked as fading. Instead, if the signal strength RX_Lev is not smaller than the reference value RX_Thr, it is examined if inter symbol interference is involved, wherein the error type is marked as inter symbol interference or other interference, wherein the error type is marked as interference.

Yet another error type can be overloading of the receiver 8, 15 (receiver compression). In such a situation, the strength of the signal to be received is so great that the operation of the receiver 8, 15 is disturbed and may cause errors in the information to be received. Compression of the receiver 8, 15 can be examined on the basis of the measured signal strength data, wherein also a second power level reference value RX_THr2 and a compression counter RC_CTR are defined. Thus, in the method according to an advantageous embodiment of the invention, the control means 11 compares the measured power level RX_Lev of the received signal with a predetermined first power level reference value RX_Thr. If the signal level RX_Lev is smaller than the first power level reference value RX_Thr, signal fading is marked as the error cause and the fading error counter F_CTR is increased by one. However, if the signal level RX_Lev is greater than the first power level reference value RX_Thr, the control means 11 compares the measured power level RX_Lev of the received signal with said second power level reference value RX_Thr2. If the signal power level RX_Lev is greater than the second power level reference value RX_Thr2, receiver compression is marked as the error cause and the compression error counter RC_CTR is increased by one. In other cases, the error was probably caused by interference, wherein the interference error counter I_CTR is increased by one.

Said second power level reference value RX_Thr2 is e.g. such a value which, according to the standard to be applied in the communication system, defines the power level of the signal to be received, at which all the receivers to be used in the communication system must be capable of receiving the signal without compression.

In this embodiment, the status data can be updated e.g. in the following way. To find out the probable cause for errors, the values of the fading error counter F_CTR, receiver compression counter RC_CTR and interference error counter I_CTR are examined. If the value of all these counters is 0, no errors were detected in the reception of the packets. In other cases, the error type is preferably selected to be the one which has the highest value in the corresponding counter. If two or more counters have the same highest value, one of these is preferably selected as the error type.

To form the additional acknowledgement data of the packets, the cause of errors in the different data frames is examined. Here it is possible to apply the method described above in this specification, e.g. in connection with FIG. 6h. The error cause is given to the access point AP1 by means of additional acknowledgement data ADD_ACK to be transmitted either in the acknowledgement message or in another message or by means of other data to be transmitted e.g. after the acknowledgement data.

The additional acknowledgement data can also consist of several parts e.g. in such a way that one part of the additional acknowledgement data gives error data formed of a certain part of the received data frames. Thus, to send the additional acknowledgement data, more bits are needed than in the above presented embodiment. The additional acknowledgement data can be formed e.g. of each record of the data buffer, wherein in the case in which the data buffer comprises the data of three data frames, the additional acknowledgement data comprises three parts.

It is obvious that the present invention is not limited solely to the embodiments presented above, but it can be modified within the scope of the appended claims.

What is claimed is:

1. Method in a wireless communication system comprising at least one wireless terminal, a communication channel and at least one access point and at least one access point controller, the method comprising the steps of:

activating at least one data transmission connection between the at least one wireless terminal and the at least one access point, in which information is transmitted in packets, forming at least one data frame for the transmission of the packets, supplementing said at least one data frame with at least one item of error checking data, in whose formation at least a part of the information contained in the at least one data frame is used, converting said at least one data frame into signals to be transmitted from the at least one access point on the communication channel, receiving signals transmitted on the communication channel and converting the received signals into at least one data frame in the at least one wireless terminal, forming reference data corresponding to at least one item of error checking data on the basis of information received in the at least one data frame, comparing the error checking data with said reference data, and setting up an acknowledgement message from the at least one wireless terminal receiving the data frames to the at least one access point transmitting the data frames, wherein the method also comprises the steps of:

determining at least a first reference value, determining at least a first error type and a second error type, forming a measuring value on the basis of the received signal, if the error checking data and the reference data do not match, a comparison is performed for comparing said first reference value with said measuring value, wherein one of the first error type and second error type is selected on the basis of the comparison for incorrectly received parts of the at least one data frames, and supplementing said acknowledgement message with information on the error type.

2. The method according to claim 1, characterized in that the conversion of data frames into signals to be transmitted on the communication channel comprises modulation stages and encoding stages, wherein the reference value is selected on the basis of the modulation and encoding used in the conversion.

3. The method according to claim 1, characterized in that also a second reference value and a third error type are determined.

4. The method according to claim 3, characterized in that the error type is determined as the first error type, if the measuring value is smaller than said first reference value; the error type is determined as the third error type, if the measuring value is greater than said second reference value; in other cases the type is determined as the second error type.

5. The method according to claim 1, characterized in that the measuring value is formed by measuring the signal strength of at least part of the signal received during the data frame.

6. The method according to claim 1, characterized in that the measuring value is formed by measuring the signal power level, preferably the average power level, of at least part of the signal received during the data frame.

7. The method according to claim 1, characterized in that the signals to be transmitted on the communication channel comprise at least one initial synchronization part, wherein the measuring value is formed by measuring the signal power level in the initial synchronization part.

8. The method according to claim 1, characterized in that the method comprises the steps of:

forming at least one data field (D) in the frames, allocating transmission slots (TS1–TSn) in said data field (D) for the transmission of packets of said data transmission connection, providing the packets with the packet error checking data on the basis of the information contained in the packet, wherein packets of said data transmission connection are received, the strength of the received signal is measured for each packet, on the basis of the information contained in each received packet, reference data is formed which is compared with the error checking information received in the packet in question, if the packet error checking data and the packet reference data do not match, said first reference value and said second reference value are compared with the strength of the received signal, wherein for the incorrectly received packets, the error type is defined as the first error type, if the strength of the received signal is smaller than said first reference value; the error type is defined as the third error type, if the strength of the received signal is greater than said second reference value; in other cases the error type is defined as the second error type, and status data is defined for the data field in such a way that in the data frame with packets marked as incorrect, the status data is marked as:

the first error type, if the number of the first error type is at least equal to the number of other error types in the incorrectly received packets of the data frame, the second error type, if the number of the second error type is greater than the number of other error types in the incorrectly received packets of the data frame, the third error type, if the number of the third error type is greater than the number of other error types in the incorrectly received packets of the data frame, faultless, if all the packets of the data frame belonging to said data transmission connection are faultlessly received.

9. The method according to claim 8, characterized in that in the method, the data frames are also provided with at least one control field (C), and the error checking data of the control field is formed on the basis of the information contained in the control field (C), wherein in the wireless terminal, on the basis of the information received in the control field (C), control field comparison data is formed which is compared with the error checking data of the control field received in said control field (C), wherein the control field (C) is marked as incorrectly received, if the error checking data of the control field and the reference data of the control field do not match.

10. The method according to claim 9, characterized in that in the method, said error type data is formed on the basis of one or several received data frames, and that said information on the error type comprises at least two parts, wherein if the second error type is more frequent than the first error type in the status data, one part of the error type data is set to contain information about the second error type, in other cases information about the first error type; and if one or several control fields (C) are marked as incorrectly received, the second part of the error type data is set to contain information about the incorrectly received control field (C), in other cases information about the faultlessly received control field (C).

11. The method according to claim 9, characterized in that in the method, a measuring value is also formed on the basis of the signal received in the control field, and said first reference value and said second reference value are compared with said measuring value, wherein on the basis of the comparison, one of said error types is selected for the control field (C) marked as incorrect.

12. The method according to claim 1, characterized in that the first error type is fading of the signal, the second error type is interference, and the third error type is signal compression.

13. The method according to claim 12, characterized in that for the transmission of signals, there are at least two channels available on the communication channel, wherein if the error type is the first error type, the access point will not conduct a channel change, and if the error type is the second or third error type, the access point will conduct a channel change.

14. The method according to claim 1, characterized in that data frames are transmitted from the access point (AP1, AP2) and received in the wireless terminals (MT1–MT4).

15. A wireless communication system comprising
at least one wireless terminal,
a communication channel,
at least one access point, and at least one access point controller,
means for activating at least one data transmission connection between the wireless terminal and the at least one access point,
means for forming at least one data frames for transmission of information in packets,
means for setting up at least one item of error checking data on at least part of information contained in the at least one data frame and for annexing it in said data frame,
means for converting the at least one data frame into signals to be transmitted from the at least one access point on the communication channel,
means for receiving signals transmitted on the communication channel and for converting the received signals into at least one data frame in the at least one wireless terminal,
means for forming reference data corresponding to at least one item of error checking data on the basis of information received in the at least one data frame, and
means for comparing the error checking data with said reference data,
means for transmitting an acknowledgement message from the at least one wireless terminal to the at least one access point that transmitted the data frames,
wherein that the wireless communication system also comprises:
means for determining at least a first reference value,
means for determining at least a first error type and a second error type,
means for forming a measuring value on a basis of the received signal,
means for performing a comparison for comparing at least the first reference value and said measuring value,
means for selecting one of said at least first error type and second error type for incorrectly received parts of the at least one data frame on the basis of the comparison, and
means for supplementing said acknowledgement message with information on the error type.

16. The wireless communication device according to claim 15, characterized in that it also comprises means for determining a second reference value and means for determining a third error type.

17. The wireless communication system according to claim 16, characterized in that the error type to be selected is arranged to be the first error type, if the measuring value is smaller than said first reference value; the third error type, if the measuring value is greater than said second reference value; in other cases the second error type.

18. The wireless communication system according to claim 16, characterized in that:
the data frames comprise at least one data field (D), transmission slots (TS1–TSn) are allocated from said data field (D) for the transmission of packets of said data transmission connection,
each packet is provided with packet error checking data on the basis of the information contained in the packet, wherein the communication system comprises:
means for receiving packets of said data transmission connection,
means for forming packet reference data on the basis of the information contained in each received packet,
means for comparing the packet reference data with the error checking information received in the packet in question,
means for measuring the strength of the signal received during each packet,
means for comparing said first reference value with the strength of the received signal, wherein for incorrectly received packets it is arranged that the error type to be defined is the first error type, if the strength of the received signal is smaller than said first reference value; the third error type, if the strength of the received signal is greater than said second reference value; in other cases the second error type, and
means for determining the status data for the data field in the data frame, wherein the status data to be marked is arranged to be
the first error type, if the number of the first error type is at least equal to the number of the second error type in the incorrectly received packets of the data frame,
the second error type, if the number of the second error type is greater than the number of the first error type in the incorrectly received packets of the data frame, faultless, if all the packets of the data frame belonging to said data transmission connection are faultlessly received.

19. The wireless communication system according to claim 18, characterized in that the data frames also comprise at least one control field (C) and that the control field is, on the basis of information contained in the control field (C), provided with error checking data for the control field.

20. The wireless communication system according to claim 16, characterized in that the means for converting the data frames into signals to be transmitted on the communication channel are provided in the access point, and the means for receiving signals transmitted on the communication channel and for converting them into data frames are provided in the wireless terminal.

21. The wireless communication system according to claim 16, characterized in that the system comprises at least a first wireless terminal and a second wireless terminal, and that the first wireless terminal comprises at least means for transmitting data frames and the second wireless terminal comprises at least means for receiving data frames.

22. The wireless communication system according to claim 16, characterized in that the system is a wireless local area network.

23. The wireless communication system according to claim 15, characterized in that the means for forming the measuring value comprise means for measuring the signal strength on at least part of the signal received during the data frame.

24. The wireless communication system according to claim 15, characterized in that the means for forming the measuring value comprise means for measuring the signal power level, preferably the average power level, on at least part of the signal received during the data frame.

25. The wireless communication system according to claim 15, characterized in that the means for converting the data frames into signals to be transmitted on the communication channel comprise means for annexing at least one initial synchronization part to the signals, wherein the means for forming the measuring value comprise means for measuring the signal strength in the initial synchronization part.

26. A method in a wireless communication system comprising at least one wireless terminal, a communication channel and at least one access point and at least one access point controller, the method comprising:
activating at least one data transmission connection between the at least one wireless terminal and the at least one access point, in which information is transmitted in packets,
forming at least one data frame for the transmission of the packets,
supplementing the at least one data frame with at least one item of error checking data, in whose formation at least a part of the information contained in the at least one data frame is used,
converting the at least one data frame into signals to be transmitted from the at least one transmitting device on the communication channel,
receiving signals transmitted on the communication channel and converting the received signals into at least one data frame in at least one receiving device,
forming reference data corresponding to at least one item of error checking data on the basis of information received in the at least one data frame,
comparing the received error checking data with the reference data, and
setting up an acknowledgement message from the at least one receiving device receiving the data frames to the at least one transmitting device transmitting the data frames,
wherein the method also comprises:
determining at least a first reference value,
determining at least a first error type and a second error type,
forming a measuring value on the basis of the received signal, and
if the error checking data and the reference data do not match, a comparison is performed for comparing said first reference value with said measuring value, wherein one of said the first error type and second error type is selected on the basis of the comparison for incorrectly received parts of the at least one data frames, and
supplementing said acknowledgement message with information on the error type.

27. The method of claim 26 wherein the at least one transmitting device is the at least one wireless terminal and the at least one receiving device is the at least one access point.

28. The method of claim 26 wherein the at least one transmitting device is the at least one access point and the at least one receiving device is the at least one wireless terminal.

29. A wireless communication system comprising
- at least one wireless terminal,
- a communication channel,
- at least one access point, and
- at least one access point controller,
- means for activating at least one data transmission connection between the wireless terminal and the at least one access point,
- means for forming at least one data frame for transmission of information in packets,
- means for setting up at least one item of error checking data on at least part of information contained in the at least one data frame and for annexing it in said at least one data frame,
- means for converting the at least one data frame into signals to be transmitted from the at least one transmitting device on the communication channel,
- means for receiving signals transmitted on the communication channel and for converting them into at least one data frame in the at least one receiving device,
- means for forming reference data corresponding to at least one item of error checking data on the basis of information received in the at least one data frame, and
- means for comparing the error checking data with said reference data,
- means for transmitting an acknowledgement message from the at least one receiving device to the at least one transmitting device that transmitted the data frames,
- wherein the wireless communication system also comprises:
  - means for determining at least a first reference value,
  - means for determining at least a first error type and a second error type,
  - means for forming a measuring value on a basis of the received signal,
  - means for performing a comparison for comparing said at least the first reference value and said measuring value,
  - means for selecting one of said at least first error type and second error type for incorrectly received parts of the at least one data frame on the basis of the comparison, and
  - means for supplementing said acknowledgement message with information on the error type.

30. The wireless communication system of claim 29 wherein the at least one transmitting device is the at least one wireless terminal and the at least one receiving device is the at least one access point.

31. The wireless communication system of claim 29 wherein the at least one transmitting device is the at least one access point and the at least one receiving device is the at least one wireless terminal.

* * * * *